(12) United States Patent
Zarifi et al.

(10) Patent No.: US 10,938,611 B2
(45) Date of Patent: *Mar. 2, 2021

(54) SOUNDING REFERENCE SIGNAL DESIGN

(71) Applicant: Huawei Technologies Co., Ltd., Shenzhen (CN)

(72) Inventors: Keyvan Zarifi, Ottawa (CA); Mohammadhadi Baligh, Ottawa (CA); Yicheng Lin, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,063

(22) Filed: Feb. 24, 2020

(65) Prior Publication Data

US 2020/0195478 A1 Jun. 18, 2020

Related U.S. Application Data

(63) Continuation of application No. 15/927,353, filed on Mar. 21, 2018, now Pat. No. 10,680,866.

(Continued)

(51) Int. Cl.
*H04L 27/26* (2006.01)
*H04B 7/024* (2017.01)
(Continued)

(52) U.S. Cl.
CPC ......... *H04L 27/2613* (2013.01); *H04B 7/024* (2013.01); *H04L 5/0048* (2013.01);
(Continued)

(58) Field of Classification Search
CPC ............... H04W 56/00; H04W 56/002; H04W 56/0045; H04W 72/0453; H04L 5/0048;
(Continued)

(56) References Cited

U.S. PATENT DOCUMENTS 9,813,208 B2    11/2017  Kim et al.
10,680,866 B2 * 6/2020  Zarifi ................. H04L 27/2613
(Continued)

FOREIGN PATENT DOCUMENTS

CA          2874463 A1      1/2014
CN        101867938 A     10/2010
(Continued)

OTHER PUBLICATIONS

Ericsson, "On SRS design", rR1-1705908, 3GPP TSG-RAN WG1, Meeting #88bix, Apr. 7, 2017, pp. 1-8, Spokane, USA.
(Continued)

*Primary Examiner* — Dung Hong
(74) *Attorney, Agent, or Firm* — Slater Matsil, LLP

(57) ABSTRACT

Methods and devices for assigning sounding reference signals (SRS) resources to UEs in a wireless communication network are provided. Configuration information is sent to a UE, the configuration information pertaining to a first sequence identifier (ID) to be used by the UE to generate a plurality of SRS sequences to be sent by the UE as at least part of a first SRS. Each SRS sequence of the plurality of SRS sequences is a function of a respective SRS sequence root that is a function of the first sequence ID. The first sequence ID may be a UE-specific sequence ID that is a function of a UE-specific ID associated with the UE, such as a Cell-Radio Network Temporary Identifier (C-RNTI).

20 Claims, 19 Drawing Sheets

Related U.S. Application Data

(60) Provisional application No. 62/502,498, filed on May 5, 2017, provisional application No. 62/476,508, filed on Mar. 24, 2017.

(51) Int. Cl.
*H04L 5/00* (2006.01)
*H04W 52/32* (2009.01)
*H01J 11/00* (2012.01)
*H04J 11/00* (2006.01)

(52) U.S. Cl.
CPC .......... *H04L 5/0053* (2013.01); *H04L 5/0091* (2013.01); *H04W 52/325* (2013.01); *H04J 11/0046* (2013.01); *H04L 5/0023* (2013.01); *H04L 5/0035* (2013.01)

(58) Field of Classification Search
CPC .. H04L 41/065; H04L 5/0091; H04L 27/2613
See application file for complete search history.

(56) References Cited

U.S. PATENT DOCUMENTS

| | | | | |
|---|---|---|---|---|
| 2011/0110357 A1* | 5/2011 | Chung | ................... | H04W 48/08 370/344 |
| 2012/0051265 A1* | 3/2012 | Shen | ................... | H04L 5/0048 370/254 |
| 2013/0028138 A1* | 1/2013 | Hao | ................... | H04L 5/0092 370/254 |
| 2013/0083683 A1* | 4/2013 | Hwang | ................ | H04L 5/0053 370/252 |
| 2013/0242911 A1* | 9/2013 | Heo | ................... | H04L 5/0048 370/329 |
| 2013/0322276 A1* | 12/2013 | Pelletier | ............ | H04W 72/0453 370/252 |
| 2014/0003262 A1* | 1/2014 | He | ................... | H04W 72/0413 370/252 |
| 2014/0050076 A1* | 2/2014 | Popovic | ............. | H04J 13/0062 370/208 |
| 2014/0376482 A1* | 12/2014 | Kim | ................... | H04L 5/0094 370/329 |
| 2015/0043465 A1* | 2/2015 | Ouchi | ................... | H04W 72/12 370/329 |
| 2015/0124579 A1* | 5/2015 | Sartori | ................... | H04W 4/70 370/210 |
| 2015/0333945 A1* | 11/2015 | Yoon | ................... | H04L 27/2607 370/329 |
| 2016/0056934 A1* | 2/2016 | Li | ................... | H04L 25/0204 370/330 |
| 2016/0119887 A1* | 4/2016 | Charipadi | .......... | H04W 56/001 370/335 |
| 2016/0192411 A1* | 6/2016 | Mori | ................... | H04W 8/06 370/329 |
| 2018/0123849 A1* | 5/2018 | Si | ................... | H04J 11/0073 |
| 2019/0036746 A1* | 1/2019 | Hwang | ................ | H04L 1/0061 |
| 2019/0200359 A1* | 6/2019 | Choi | ................... | H04L 25/0224 |

FOREIGN PATENT DOCUMENTS

| | | |
|---|---|---|
| CN | 102026298 A | 4/2011 |
| CN | 104335639 A | 2/2015 |
| CN | 104521156 A | 4/2015 |
| CN | 106304346 A | 1/2017 |
| EP | 2819312 A1 | 12/2014 |
| WO | 2011035590 A1 | 3/2011 |
| WO | 2014022773 A1 | 2/2014 |

OTHER PUBLICATIONS

Mitsubishi Electric, "Views on SRS sequence generation methods", 3GPP TSG RAN WG1 Meeting #88bis, R1-1705819, Apr. 7, 2017, pp. 1-5, Spokane, USA.

Huawei, et al., "UL SRS sequence design in NR", 3GPP TSG RAN WG1 Meeting #89, R1-1708171, May 15-19, 2017, 10 Pages, Hangzhou, China.

Mitsubishi Electric, "Views on SRS sequence generation methods", 3GPP TSG RAN WG1 Meeting #88, R1-1702756, Feb. 13-17, 2017, 4 Pages, Athens, Greece.

"3rd Generation Partnership Project; Technical Specification Group Radio Access Network; Evolved Universal Terrestrial Radio Access (E-UTRA); Physical channels and modulation (Release 13)," 3GPP TS 36.211, V13.1.0, Mar. 2016, Technical Specification, 155 pages.

* cited by examiner

SOUNDING REFERENCE SIGNAL DESIGN

CROSS-REFERENCE TO RELATED APPLICATIONS

This application is a continuation of U.S. patent application Ser. No. 15/927,353 entitled "SOUNDING REFERENCE SIGNAL DESIGN" filed Mar. 21, 2018, which claims the benefit of U.S. Provisional Patent Application No. 62/476,508 entitled "SOUNDING REFERENCE SIGNAL DESIGN" filed Mar. 24, 2017, and U.S. Provisional Patent Application No. 62/502,498 entitled "SOUNDING REFERENCE SIGNAL DESIGN" filed May 5, 2017, the entire contents of which are incorporated herein by reference.

TECHNICAL FIELD

The present disclosure relates generally to a system and method for wireless communications, and, in particular embodiments, to a system and method for sounding reference design.

BACKGROUND

In wireless communications sounding reference signals (SRSs) may be used for a variety of purposes including channel state information (CSI) acquisition, beam management and Uplink (UL)-based radio resource management (RRM) measurements.

Contrary to a typical LTE cell serviced by one transmit/receive point with a unique cell ID, a New Radio (NR) cell, in a NR system, may include many transmit/receive points (TRPs) using the same NR cell ID, which NR cell may cover a much broader area. As a result, the number of active user equipments (UEs) in an NR Cell may far exceed the number of active UEs in a typical LTE Cell. There is a need, therefore, for an improved SRS approach for use in such NR systems.

SUMMARY

It is an object of the application to present methods and structures that overcome the difficulties of operating a cellular network with one or more New Radio (NR) cells, particularly in the management of sounding reference signals (SRSs) transmitted by User Equipment (UE).

According to a first aspect, the present disclosure provides a method of assigning sounding reference signals in a wireless communication network. The method according to the first aspect includes: sending first configuration information pertaining to a first sequence identifier (ID) to be used by a first user equipment (UE) to generate a first plurality of SRS sequences to be sent by the first UE as at least part of a first SRS, each SRS sequence of the first plurality of SRS sequences being a function of a respective SRS sequence root that is a function of the first sequence ID.

In some embodiments of the first aspect, the first configuration information includes information to selectively enable or disable dependence of the SRS sequence roots on an SRS sequence scheduling time.

In some embodiments of the first aspect, the SRS sequence scheduling time has an orthogonal frequency division multiplexing (OFDM) symbol time granularity.

In some embodiments of the first aspect, the first plurality of SRS sequences are to be sent by the first UE in respective orthogonal frequency division multiplexing (OFDM) symbol intervals within a time slot.

In some embodiments of the first aspect, the first sequence ID overrides a default sequence ID.

In some embodiments of the first aspect, the default sequence ID for the first UE is a function of a UE-specific ID associated with the first UE.

In some embodiments of the first aspect, the first sequence IDs is a function of a UE-specific ID associated with the first UE.

In some embodiments of the first aspect, the UE-specific ID associated with the first UE is a Cell-Radio Network Temporary Identifier (C-RNTI) associated with the first UE.

In some embodiments of the first aspect, the first sequence ID is a function of a UE group-specific sequence ID that is assigned to a UE group to which the first UE belongs.

In some embodiments of the first aspect, the method further includes: sending second configuration information pertaining to a second sequence ID to be used by a second UE to generate a second plurality of SRS sequences to be sent by the second UE as at least part of a second SRS, each SRS sequence of the second plurality of SRS sequences being a function of a respective SRS sequence root that is a function of the second sequence ID.

In some embodiments of the first aspect, the first plurality of SRS sequences are to be sent by the first UE as at least part of the first SRS using a first time and frequency resource, the second plurality of SRS sequences are to be sent by the second UE as at least part of the second SRS using a second time and frequency resource, and the first time and frequency resource at least partially overlaps with the second time and frequency resource.

In some embodiments of the first aspect, the method further includes: sending first physical resource mapping configuration information pertaining to a first allowed number of SRS bandwidths to be used by the first UE for physical resource mapping of the first SRS; and sending second physical resource mapping configuration information pertaining to a second allowed number of SRS bandwidths to be used by the second UE for physical resource mapping of the second SRS.

In some embodiments of the first aspect, the method further includes: sending third configuration information pertaining to a third sequence ID to be used by the first UE to generate a third plurality of SRS sequences to be sent by the first UE as at least part of the first SRS, each SRS sequence of the third plurality of SRS sequences being a function of a respective SRS sequence root that is a function of the third sequence ID.

According to a second aspect, the present disclosure provides a transmit/receive point (TRP) that includes: a wireless communication interface; a memory storage comprising instructions; and one or more processors in communication with the memory and the wireless communication interface. The one or more processors execute the instructions to: send first configuration information pertaining to a first sequence identifier (ID) to be used by a first user equipment (UE) to generate a first plurality of SRS sequences to be sent by the first UE as at least part of a first SRS, each SRS sequence of the first plurality of SRS sequences being a function of a respective SRS sequence root that is a function of the first sequence ID.

In some embodiments of the second aspect, the first configuration information include information to selectively enable or disable dependence of the SRS sequence roots on an SRS sequence scheduling time.

In some embodiments of the second aspect, the SRS sequence scheduling time has an orthogonal frequency division multiplexing (OFDM) symbol time granularity.

In some embodiments of the second aspect, the first plurality of SRS sequences are to be sent by the first UE in respective orthogonal frequency division multiplexing (OFDM) symbol intervals within a time slot.

In some embodiments of the second aspect, the first sequence IDs is a function of a UE-specific sequence ID associated with the first UE.

In some embodiments of the second aspect, the UE-specific ID associated with the first UE is a Cell-Radio Network Temporary Identifier (C-RNTI) associated with the first UE.

In some embodiments of the second aspect, the one or more processors execute the instructions to: send second configuration information pertaining to a second sequence ID to be used by a second UE to generate a second plurality of SRS sequences to be sent by the second UE as at least part of a second SRS, each SRS sequence of the second plurality of SRS sequences being a function of a respective SRS sequence root that is a function of the second sequence ID.

In some embodiments of the second aspect, the first plurality of SRS sequences are to be sent by the first UE as at least part of the first SRS using a first time and frequency resource, the second plurality of SRS sequences are to be sent by the second UE as at least part of the second SRS using a second time and frequency resource, and the first time and frequency resource at least partially overlaps with the second time and frequency resource.

In some embodiments of the second aspect, the one or more processors execute the instructions to: send first physical resource mapping configuration information pertaining to a first allowed number of SRS bandwidths to be used by the first UE for physical resource mapping of the first SRS; and send second physical resource mapping configuration information pertaining to a second allowed number of SRS bandwidths to be used by the second UE for physical resource mapping of the second SRS.

In some embodiments of the second aspect, the one or more processors execute the instructions to: send third configuration information pertaining to a third sequence ID to be used by the first UE to generate a third plurality of SRS sequences to be sent by the first UE as at least part of the first SRS, each SRS sequence of the third plurality of SRS sequences being a function of a respective SRS sequence root that is a function of the third sequence ID.

According to a third aspect, the present disclosure provides a method of generating sounding reference signals in a wireless communication network. The method includes: receiving, at a user equipment (UE), configuration information pertaining to a first sequence identifier (ID); determining, at the UE, a first plurality of sounding reference signal (SRS) sequence roots as a function of the first sequence ID; generating, at the UE, a first plurality of SRS sequences based in part on the first plurality of SRS sequence roots; and sending, from the UE, the first plurality of SRS sequences as at least part of a first SRS.

In some embodiments of the third aspect, the first configuration information includes information to selectively enable or disable dependence of the SRS sequence roots on an SRS sequence scheduling time.

In some embodiments of the third aspect, the SRS sequence scheduling time has an orthogonal frequency division multiplexing (OFDM) symbol time granularity.

In some embodiments of the third aspect, sending the first plurality of SRS sequences as at least part of a first SRS includes sending the first plurality of SRS sequences in respective orthogonal frequency division multiplexing (OFDM) symbol intervals within a time slot.

In some embodiments of the third aspect, the first sequence ID overrides a default sequence ID.

In some embodiments of the third aspect, the default sequence ID for the UE is a function of a UE-specific ID associated with the UE.

In some embodiments of the third aspect, the first sequence ID is a function of a UE-specific ID associated with the UE.

In some embodiments of the third aspect, the UE-specific ID associated with the UE is a Cell-Radio Network Temporary Identifier (C-RNTI) associated with the UE.

In some embodiments of the third aspect, the first sequence ID is a function of a UE group-specific sequence ID that is assigned to a UE group to which the UE belongs.

In some embodiments of the third aspect, the first SRS is to be sent by the UE using a first time and frequency resource that at least partially overlaps with a second time and frequency resource used by a second UE to send a second SRS, wherein the UEs are served by respective subsets of at least one transmit/receive point in the same cell.

In some embodiments of the third aspect, sending the first plurality of SRS sequences as at least part of the first SRS includes mapping the first plurality of SRS sequences to physical resources based on a network configurable number of allowed SRS bandwidths.

In some embodiments of the third aspect, the method further includes, determining, at the UE, the number of allowed SRS bandwidths based on a UE-specific ID associated with the UE or a UE group-specific ID associated with a UE group to which the UE belongs.

According to a fourth aspect, the present disclosure provides a user equipment (UE) that includes: a wireless communication interface; a memory storage comprising instructions; and one or more processors in communication with the memory and the wireless communication interface. The one or more processors execute the instructions to: receive configuration information pertaining to a first sequence identifier (ID); determine a first plurality of sounding reference signal (SRS) sequence roots as a function of the first sequence ID; generate a first plurality of SRS sequences based at least in part on the first plurality of SRS sequence roots; and send the first plurality of SRS sequence as at least part of a first SRS.

In some embodiments of the fourth aspect, the first configuration information includes information to selectively enable or disable dependence of the SRS sequence roots on an SRS sequence scheduling time.

In some embodiments of the fourth aspect, the SRS sequence scheduling time has an orthogonal frequency division multiplexing (OFDM) symbol time granularity.

In some embodiments of the fourth aspect, sending the first plurality of SRS sequences as at least part of a first SRS includes sending the first plurality of SRS sequences in respective orthogonal frequency division multiplexing (OFDM) symbol intervals within a time slot.

In some embodiments of the fourth aspect, the first sequence ID is a function of a UE-specific ID associated with the UE.

In some embodiments of the fourth aspect, the UE-specific ID associated with the UE is a Cell-Radio Network Temporary Identifier (C-RNTI) associated with the UE.

In some embodiments of the fourth aspect, the first SRS is to be sent by the UE using a first time and frequency resource that at least partially overlaps with a second time and frequency resource used by a second UE to send a second SRS, wherein the UEs are served by respective subsets of at least one transmit/receive point in the same cell.

In some embodiments of the fourth aspect, sending the first plurality of SRS sequences as at least part of the first SRS includes mapping the first plurality of SRS sequences to physical resources based on a network configurable number of allowed SRS bandwidths.

In some embodiments of the fourth aspect, the one or more processors execute the instructions to: determine the number of allowed SRS bandwidths based on a UE-specific ID associated with the UE or a UE group-specific ID associated with a UE group to which the UE belongs.

According to a fifth aspect, the present disclosure provides a method of assigning sounding reference signals in a wireless communication network, the method including: sending first configuration information pertaining to a first sounding reference signal (SRS) sequence to be sent by a first user equipment (UE), the first SRS sequence being a function of the first configuration information and a first SRS sequence root that is a function of a first UE-specific sequence identifier (ID) that is a function of a first UE-specific ID associated with the first UE.

In some embodiments of the fifth aspect, the first UE-specific ID associated with the first UE is a Cell-Radio Network Temporary Identifier (C-RNTI) associated with the first UE.

In some embodiments of the fifth aspect, the first configuration information comprises at least one of: SRS sequence scheduled timing information, SRS sequence length information, physical resource mapping information, transmission comb information, cyclic shift information, and frequency hopping information.

In some embodiments of the fifth aspect, the first configuration information further comprises information to selectively enable or disable dependence of the first SRS sequence root on the SRS sequence scheduled timing information.

In some embodiments of the fifth aspect, the SRS sequence scheduled timing information has an orthogonal frequency division multiplexing (OFDM) symbol time granularity.

In some embodiments of the fifth aspect, the method further includes: sending second configuration information pertaining to a second SRS sequence to be sent by a second UE, the second SRS sequence being a function of the second configuration information and a second SRS sequence root that is a function of a second UE-specific sequence ID that is a function of a second UE-specific ID associated with the second UE.

In some embodiments of the fifth aspect, the first SRS sequence is to be sent by the first UE using a first time and frequency resource, the second SRS sequence is to be sent by the second UE using a second time and frequency resource, and the first time and frequency resource at least partially overlaps with the second time and frequency resource.

In some embodiments of the fifth aspect, the first and second SRS sequence roots are different; and the first and second SRS sequences are mapped to non-overlapping time and frequency resource elements.

In some embodiments of the fifth aspect, the method further includes: sending third configuration information pertaining to a third SRS sequence to be sent by the first UE as part of a first SRS that also includes the first SRS sequence, the third SRS sequence being a function of the third configuration information and a third SRS sequence root that is a function of a third UE-specific sequence ID that is a function of the first UE-specific ID associated with the first UE; and sending fourth configuration information pertaining to a fourth SRS sequence to be sent by the second UE as part of a second SRS that also includes the second SRS sequence, the fourth SRS sequence being a function of the fourth configuration information and a fourth SRS sequence root that is a function of a fourth UE-specific sequence ID that is a function of the second UE-specific ID associated with the second UE.

In some embodiments of the fifth aspect, the third and fourth SRS sequences are mapped to fully overlapping time and frequency resource elements; and the third and fourth SRS sequences are orthogonal.

In some embodiments of the fifth aspect, the third and fourth SRS sequence roots are the same; and the fourth SRS sequence is a cyclic shift of the third SRS sequence.

In some embodiments of the fifth aspect, the method further includes receiving, from the first UE, the first SRS that includes at least the first SRS sequence and the third SRS sequence.

According to a sixth aspect, the present disclosure provides a transmit/receive point (TRP) comprising: a wireless communication interface; a memory storage comprising instructions; and one or more processors in communication with the memory storage and the wireless communication interface, wherein the one or more processors execute the instructions to: send first configuration information pertaining to a first sounding reference signal (SRS) sequence to be sent by a first user equipment (UE), the first SRS sequence being a function of the first configuration information and a first SRS sequence root that is a function of a first UE-specific sequence identifier (ID) that is a function of a first UE-specific ID associated with the first UE.

In some embodiments of the sixth aspect, the first UE-specific ID associated with the first UE is a Cell-Radio Network Temporary Identifier (C-RNTI) associated with the first UE.

In some embodiments of the sixth aspect, the first configuration information comprises at least one of: SRS sequence scheduled timing information, SRS sequence length information, physical resource mapping information, transmission comb information, cyclic shift information, and frequency hopping information.

In some embodiments of the sixth aspect, the first configuration information further comprises information to selectively enable or disable dependence of the first SRS sequence root on the SRS sequence scheduled timing information.

In some embodiments of the sixth aspect, the SRS sequence scheduled timing information has an orthogonal frequency division multiplexing (OFDM) symbol time granularity.

In some embodiments of the sixth aspect, the one or more processors execute the instructions to: send second configuration information pertaining to a second SRS sequence to be sent by a second UE, the second SRS sequence being a function of the second configuration information and a second SRS sequence root that is a function of a second UE-specific sequence ID that is a function of a second UE-specific ID associated with the second UE.

In some embodiments of the sixth aspect, the first SRS sequence is to be sent by the first UE using a first time and frequency resource, the second SRS sequence is to be sent by the second UE using a second time and frequency resource, and the first time and frequency resource at least partially overlaps with the second time and frequency resource.

In some embodiments of the sixth aspect, the first and second SRS sequence roots are different; and the first and second SRS sequences are mapped to non-overlapping time and frequency resource elements.

In some embodiments of the sixth aspect, the one or more processors execute the instructions to: send third configuration information pertaining to a third SRS sequence to be sent by the first UE as part of a first SRS that also includes the first SRS sequence, the third SRS sequence being a function of the third configuration information and a third SRS sequence root that is a function of a third UE-specific sequence ID that is a function of the first UE-specific ID associated with the first UE; and send fourth configuration information pertaining to a fourth SRS sequence to be sent by the second UE as part of a second SRS that also includes the second SRS sequence, the fourth SRS sequence being a function of the fourth configuration information and a fourth SRS sequence root that is a function of a fourth UE-specific sequence ID that is a function of the second UE-specific ID associated with the second UE.

In some embodiments of the sixth aspect, the third and fourth SRS sequences are mapped to fully overlapping time and frequency resource elements; and the third and fourth SRS sequences are orthogonal.

In some embodiments of the sixth aspect, the third and fourth SRS sequence roots are the same; and the fourth SRS sequence is a cyclic shift of the third SRS sequence.

In some embodiments of the sixth aspect, the one or more processors execute the instructions to: receive, from the first UE, the first SRS that includes at least the first SRS sequence and the third SRS sequence.

According to a seventh aspect, the present disclosure provides a method of generating sounding reference signals in a wireless communication network, the method including: receiving, at a user equipment (UE), first configuration information pertaining to a first sounding reference signal (SRS) sequence; determining, at the UE, a first sounding reference signal (SRS) sequence root as a function of a first UE-specific sequence identifier (ID) that is a function of a first UE-specific ID associated with the UE; generating, at the UE, the first SRS sequence based at least in part on the first configuration information and the first SRS sequence root; and sending, from the UE, the first SRS sequence as at least part of a first SRS.

In some embodiments of the seventh aspect, the first UE-specific ID associated with the UE is a Cell-Radio Network Temporary Identifier (C-RNTI) associated with the UE.

In some embodiments of the seventh aspect, the first configuration information comprises at least one of: SRS sequence scheduled timing information, SRS sequence length information, physical resource mapping information, transmission comb information, cyclic shift information, and frequency hopping information.

In some embodiments of the seventh aspect, the SRS sequence scheduled timing has an orthogonal frequency division multiplexing (OFDM) symbol time granularity.

In some embodiments of the seventh aspect, the first configuration information further comprises information to selectively enable or disable dependence of the first SRS sequence root on the SRS sequence scheduled timing information, and the method further comprises: enabling or disabling the dependence of the first SRS sequence root on the SRS sequence scheduling time in accordance with the first configuration information.

In some embodiments of the seventh aspect, determining the first SRS sequence root comprises determining a plurality of SRS sequence roots, inclusive of the first SRS sequence root, that are each a function of the first UE-specific sequence ID; generating the first SRS sequence comprises generating a plurality of first SRS sequences, inclusive of the first SRS sequence, based at least in part on the plurality of first SRS sequence roots; and sending the first SRS sequence as at least part of the first SRS comprises sending the plurality of first SRS sequences as at least part of the first SRS.

In some embodiments of the seventh aspect, each first SRS sequence root of the plurality of first SRS sequence roots is a function of a respective OFDM symbol time.

In some embodiments of the seventh aspect, the method further includes: determining, at the UE, a third SRS sequence root as a function of a third UE-specific sequence ID that is a function of the first UE-specific ID associated with the UE; generating, at the UE, a third SRS sequence based at least in part on the third SRS sequence root; and sending, from the UE, the third SRS sequence as part of the first SRS.

In some embodiments of the seventh aspect, the first SRS is sent by the UE using a first time and frequency resource that at least partially overlaps with a second time and frequency resource used by a second UE to send a second SRS, wherein the UEs are served by respective subsets of at least one transmit/receive point (TRP) in the same cell.

In some embodiments of the seventh aspect, sending the first SRS sequence as at least part of the first SRS comprises mapping the first SRS sequence to physical resources based on a network configurable number of allowed SRS bandwidths.

In some embodiments of the seventh aspect, the method further includes, determining, at the UE, the number of allowed SRS bandwidths based on the first UE-specific ID associated with the UE or a UE group-specific ID associated with a UE group to which the UE belongs.

According to an eighth aspect, the present disclosure provides a user equipment (UE) comprising: a wireless communication interface; a memory storage comprising instructions; and one or more processors in communication with the memory and the wireless communication interface, wherein the one or more processors execute the instructions to: receive first configuration information pertaining to a first sounding reference signal (SRS) sequence; determine a first sounding reference signal (SRS) sequence root as a function of a first UE-specific sequence identifier (ID) that is a function of a first UE-specific ID associated with the UE; generate the first SRS sequence based at least in part on the first configuration information and the first SRS sequence root; and send the first SRS sequence as at least part of a first SRS.

In some embodiments of the eighth aspect, the first UE-specific ID associated with the UE is a Cell-Radio Network Temporary Identifier (C-RNTI) associated with the UE.

In some embodiments of the eighth aspect, the first configuration information comprises at least one of: SRS sequence scheduled timing information, SRS sequence length information, physical resource mapping information, transmission comb information, cyclic shift information, and frequency hopping information.

In some embodiments of the eighth aspect, the SRS sequence scheduled timing has an orthogonal frequency division multiplexing (OFDM) symbol time granularity.

In some embodiments of the eighth aspect, the first configuration information further comprises information to selectively enable or disable dependence of the first SRS sequence root on the SRS sequence scheduled timing information, and the one or more processors execute the instructions to: enable or disable the dependence of the first SRS sequence root on the SRS sequence scheduling time in accordance with the first configuration information.

In some embodiments of the eighth aspect, determining the first SRS sequence root comprises determining a plurality of SRS sequence roots, inclusive of the first SRS sequence root, that are each a function of the first UE-specific sequence ID; generating the first SRS sequence comprises generating a plurality of first SRS sequences, inclusive of the first SRS sequence, based at least in part on the plurality of first SRS sequence roots; and sending the first SRS sequence as at least part of the first SRS comprises sending the plurality of first SRS sequences as at least part of the first SRS.

In some embodiments of the eighth aspect, each first SRS sequence root of the plurality of first SRS sequence roots is a function of a respective OFDM symbol time.

In some embodiments of the eighth aspect, the one or more processors execute the instructions to: determine a third SRS sequence root as a function of a third UE-specific sequence ID that is a function of the first UE-specific ID associated with the UE; generate a third SRS sequence based at least in part on the third SRS sequence root; and send the third SRS sequence as part of the first SRS.

In some embodiments of the eighth aspect, the first SRS is sent by the UE using a first time and frequency resource that at least partially overlaps with a second time and frequency resource used by a second UE to send a second SRS, wherein the UEs are served by respective subsets of at least one transmit/receive point (TRP) in the same cell.

In some embodiments of the eighth aspect, sending the first SRS sequence as at least part of the first SRS comprises mapping the first SRS sequence to physical resources based on a network configurable number of allowed SRS bandwidths.

In some embodiments of the eighth aspect, the one or more processors execute the instructions to: determine the number of allowed SRS bandwidths based on the first UE-specific ID associated with the UE or a UE group-specific ID associated with a UE group to which the UE belongs.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable media.

Figure 1:
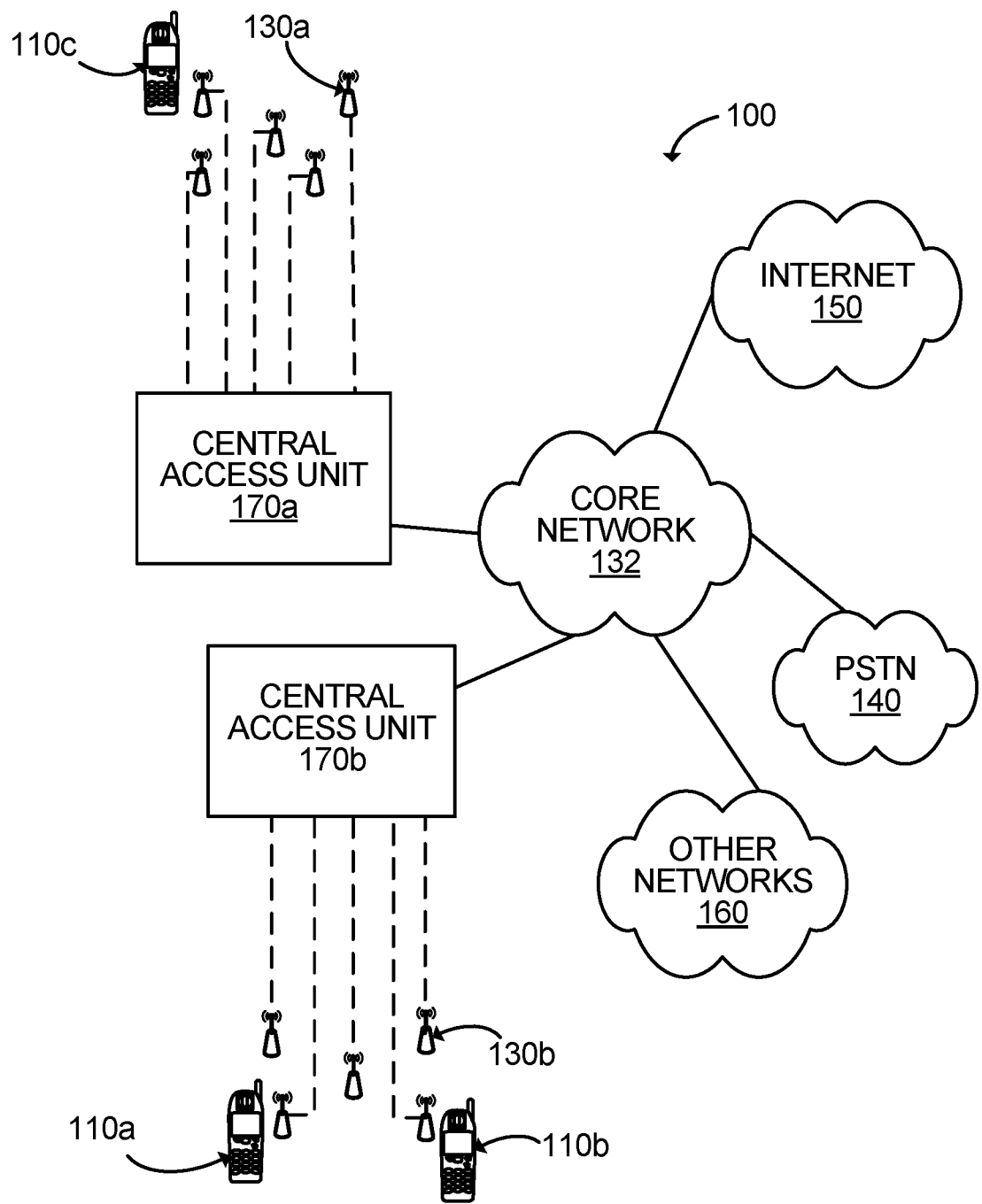
FIG. 1 illustrates an embodiment of a New Radio (NR) network in accordance with the present disclosure.

FIG. 1 illustrates an embodiment of a New Radio (NR) network in accordance with the present disclosure. Contrary to a typical LTE cell serviced by one transmit/receive point with a unique cell ID, a New Radio (NR) cell, in a NR system, may include many transmit/receive points (transmit/receive points) using the same NR cell ID, which NR cell may cover a much broader area. Generally, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA). Although FIG. 1 illustrates one embodiment of an architecture for supporting NR cells, embodiments of the present disclosure are not limited to this architecture. That is to say, other network architectures for supporting NR cells are also possible. For example, any network architecture where transmit/receive points in the network are controlled by one or more central access units with centralized signal processing capability can also work.

In the embodiment of FIG. 1, NR cell communication system 100 includes user equipment (UE) 110a-110c, transmit/receive points, including transmit/receive points 130a and 130b, central access units 170a and 170b, a core network 132, a public switched telephone network (PSTN) 140, the Internet 150, and other networks 160. Note, however, that this is just an embodiment and the NR system could have more or less transmit/receive points and/or central access units.

The UEs 110a-110c are configured to operate and/or communicate in the system 100. For example, the UEs 110a-110c are configured to transmit and/or receive wireless signals. Each UE 110a-110c represents any suitable end user device and which may also be referred to as user a wireless transmit/receive unit (WTRU), mobile station, fixed or mobile subscriber unit and may include a cellular telephone, personal digital assistant (PDA), smartphone, laptop or tablet for example.

Transmit/receive points, including transmit/receive points 130a 130b, can include, for example, mobile-relay stations, base stations, pico transmitters, or femto transmitters. The transmit/receive points can also be remote radio heads (RRHs) in some implementations. A RRH contains radio frequency circuitry plus analog-to-digital/digital-to-analog converters and up/down converters. The RRHs are located between a base station and the UEs, and are connected to a base station using optical fiber, a wireless channel or any other communication line. The RRHs receive and convert digital signals to analog, then amplifies the power and sends the radio frequency signals. The base stations can include a base transceiver station (BTS), a Node-B (NodeB), an evolved NodeB (eNodeB), a Home NodeB, a Home eNodeB, an access point (AP), or a wireless router.

In one arrangement, central access unit 170a can control a first group of transmit/receive points including transmit/receive point 130a while central access unit 170b can control a second group of transmit/receive points including transmit/receive point 130b. For example, a central access unit could be a gNodeB. Note, while central access units 170a and 170b are shown separate from their respective transmit/receive points, the central access units could alternatively be co-located with one or more of their respective transmit/receive points and the transmit/receive points could communicate with each other (e.g., a gNodeB could be collocated with one or more transmit/receive points and communicate with other transmit/receive points through an X2 interface). If not collocated, a central access unit could communicate with other transmit/receive points via an optical, wireless or other connection. Central access units 170a and 170b could also communicate directly without use of core network 132.

All or a subset of transmit/receive points associated with central access units 170a may be assigned a common NR cell ID to form a NR cell. Similarly, all or a subset of transmit/receive points associated with central access unit 170b may be assigned a different common NR cell ID to form another NR cell. Alternatively, all or a subset of transmit/receive points associated with central access units 170a and 170b could be assigned a common NR cell ID, in which case the NR cell would have two central access units associated therewith. The transmit/receive points associated with central access unit 170a, 170b, and/or 170a and 170b together could also support multiple NR cells by using different subsets of transmit/receive points.

Figure 2:
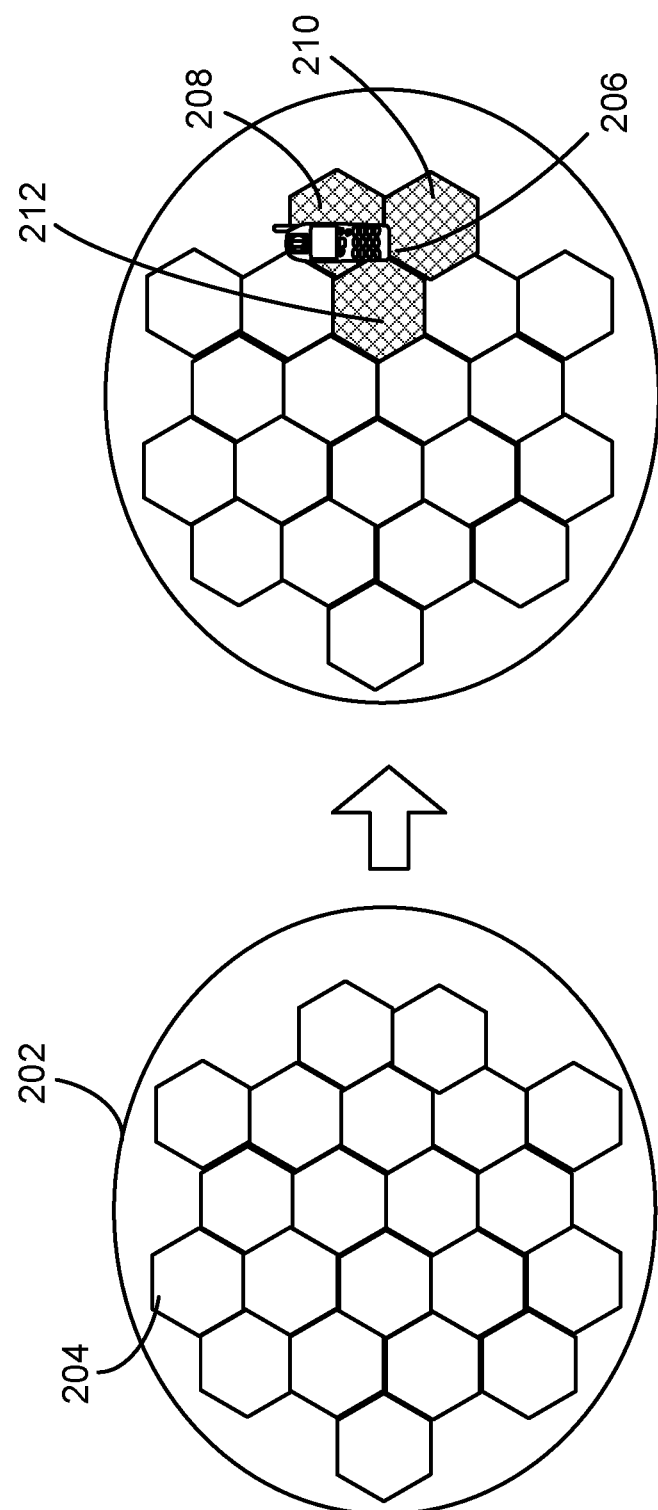
FIG. 2 illustrates an embodiment of a NR cell in accordance with the present disclosure.

FIG. 2 presents a diagram illustrating an NR cell in a NR system. A NR cluster 202 includes a number of coverage areas of transmit/receive points, such as coverage area 204. To create a NR cell, the system (via one or more central access units) assigns a common cell ID to all the transmit/receive points of the NR cluster that will form the NR cell. The system may create multiple NR cells within a NR cluster. Each NR cell has a unique NR cell ID that is common to and shared by all transmit/receive points associated with the respective NR cell.

FIG. 2 illustrates an embodiment of a NR cell in accordance with the present disclosure. Shown are transmit/receive points for facilitating NR data channels and NR control channels for UE 206. The three transmit/receive points 208, 210, and 212 are optimally situated to communicate the NR channels with UE 206. The transmit/receive points form a virtual transmit/receive point. The system can dynamically combine multiple physical transmitters and receivers to form a virtual transmit/receive point. From the perspective of a UE, the virtual transmit/receive points appear to be a single transmitter. In fact, a UE does not need to know with which transmit/receive point or set of points the UE is communicating with. The transmit/receive points used on the uplink may also differ from those used on the downlink. The system may create many virtual transmit/receive points for a NR cell and coordinate their transmissions. The system can also dynamically change the physical transmit/receive points that make up the NR cell.

Figure 3:
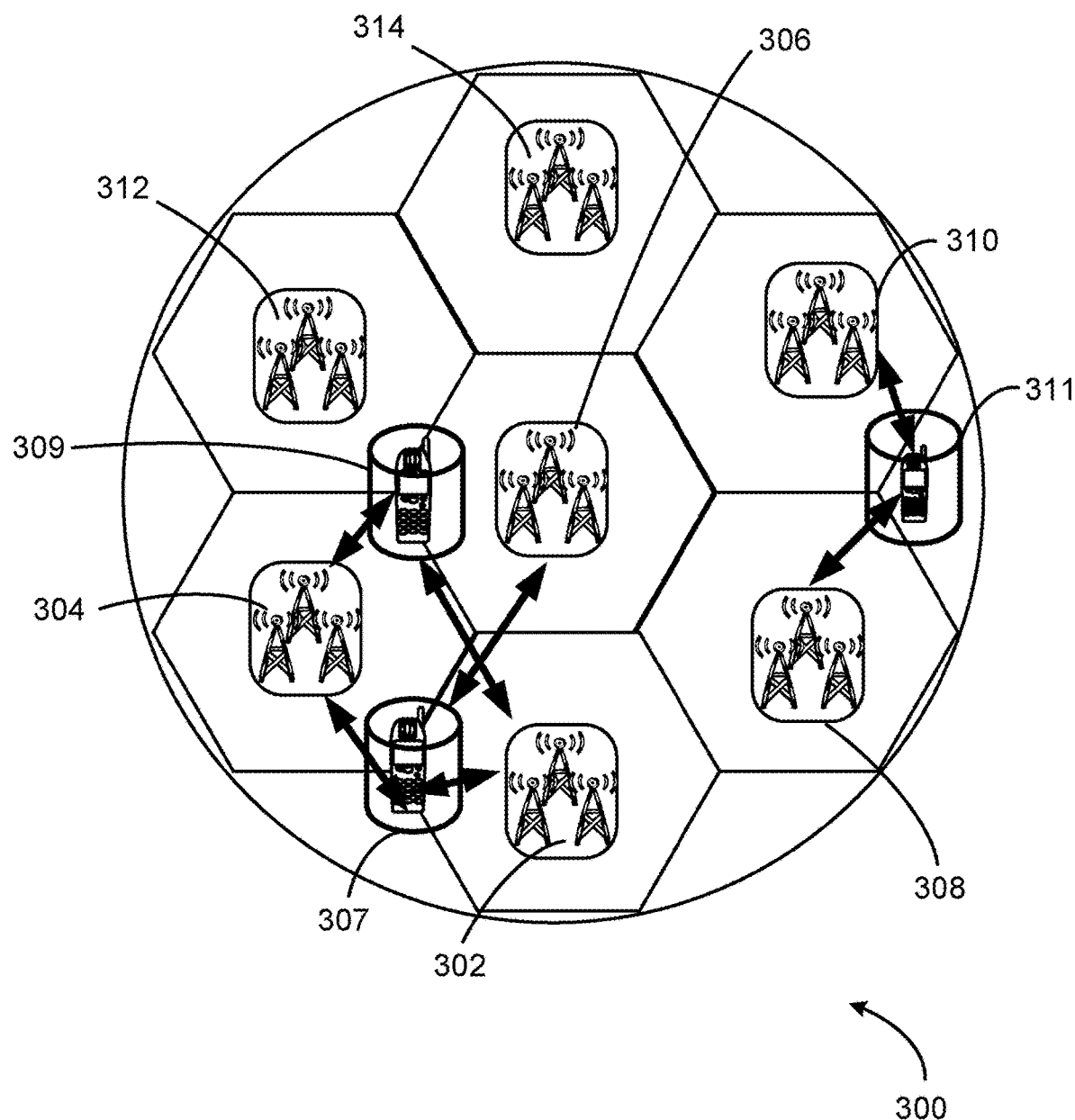
FIG. 3 illustrates another embodiment of a NR cell in accordance with the present disclosure.

FIG. 3 illustrates another embodiment of a NR cell in accordance with the present disclosure. In particular, FIG. 3 presents a diagram of an embodiment of an NR cell that facilitates multiple NR channels. The system can support multiple parallel NR channels within a single NR cell, each serving a different UE. The NR cell may also utilize multiple different physical transmit/receive points or combinations of transmit/receive points to create the NR data channels. The actual physical transmit/receive points of the NR data channels are also UE-specific and are transparent to each UE. As the UEs move to different locations, the system can dynamically assign different physical transmit/receive points to service the UEs. Once again, the NR cell ID transmitted from the different physical transmit/receive points belonging to the same NR cell remains the same. As illustrated in FIG. 3, an embodiment of a NR cell 300 is shown supporting three NR channels, one for each UE. Three transmit/receive points 302, 304, 306 provide a NR data channel for UE 307, two transmit/receive points 302, 304 provide a NR data channel for UE 309, and two transmit/receive points 308, 310 provide a NR data channel for UE 311. Transmit/receive points 312, 314 are silent and may be turned off to save energy. In one arrangement, a central access unit can control the generation of the NR channels based on load balancing and UE distribution within a NR cell.

Figure 4:
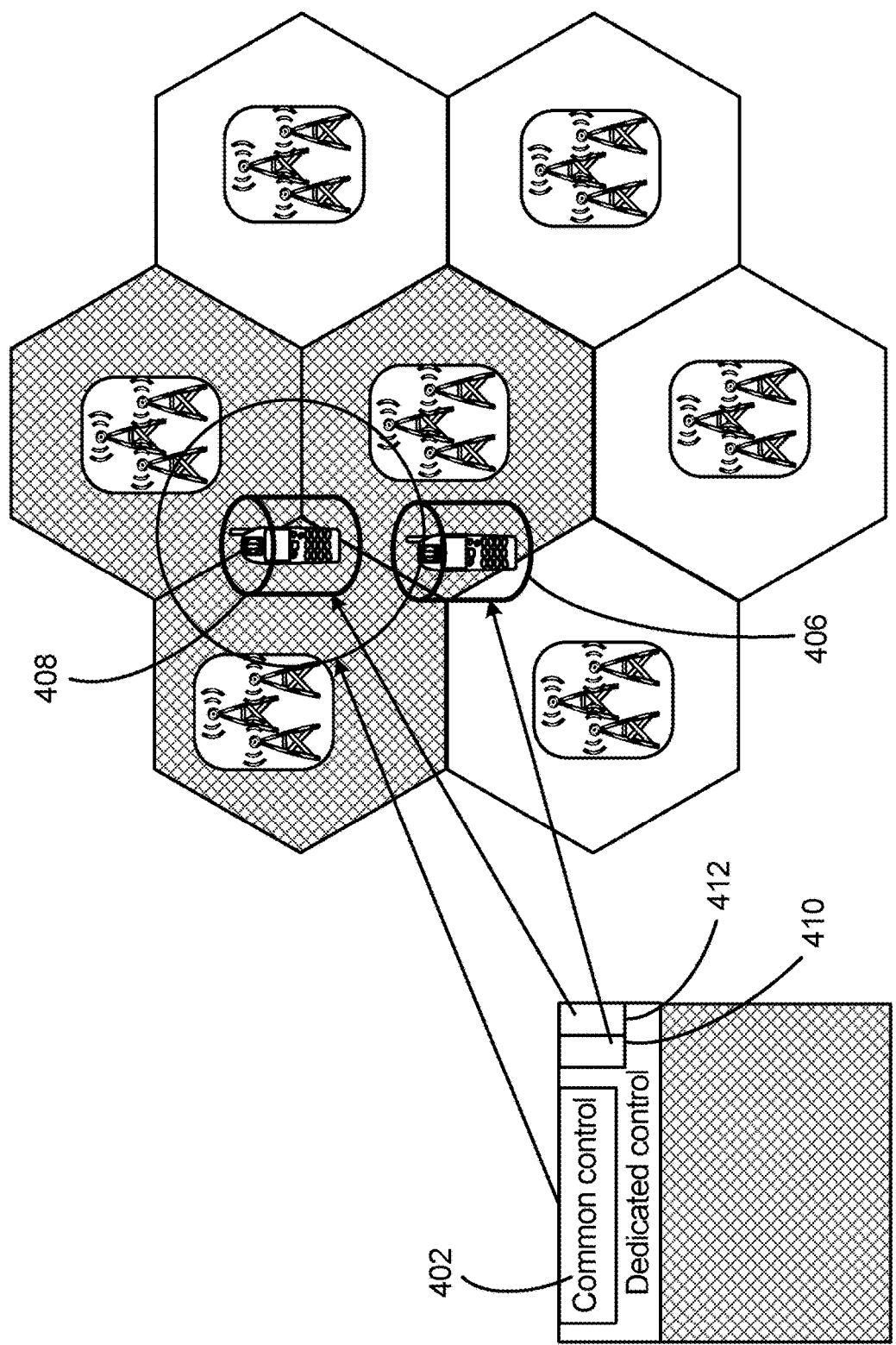
FIG. 4 illustrates another embodiment of a NR cell in accordance with the present disclosure.

FIG. 4 illustrates another embodiment of a NR cell in accordance with the present disclosure. As shown therein, each of UEs 406, 408 has a subset of transmit/receive points surrounding the UE. The transmit/receive points transmit the UE-specific NR dedicated control channels 410, 412. Also shown is common control channel 402. NR dedicated control channel 410 is specific to UE 406, and NR dedicated control channel 412 is specific to UE 408. One or more transmission schemes of the NR data channel and/or the NR dedicated control channel, including scrambling, pilot design, and/or pilot sequence and location, are created in accordance with a UE ID. Further, a NR cell ID can be applied together with the UE ID to differentiate transmission of the NR data channel and/or NR control channel from different NR cells. Parallel NR dedicated control channels can be provided in each NR cell. The demodulation of each NR dedicated control channel is performed in accordance with a UE-specific reference signal (RS), the sequence and location of which are linked to the UE ID. To distinguish the NR dedicated control channels communicated from different NR cells, the sequence of UE-specific RS is associated with a sequence specific to each NR cell. The system may apply transmit/receive point selection techniques and transmit power control techniques to minimize intra-NR cell interference and inter-NR cell interference. For a UE with a poor Signal to Interference plus Noise Ratio (SINR), the system can transmit the NR dedicated control channel and/or NR data channel from multiple transmit/receive points to improve signal quality, including using MIMO processing. In addition, the system may apply Transmit Time Interval (TTI) bundling to a fixed or slow moving UE in order to further enhance the capacity of the UE-specific virtual dedicated control channel.

Sounding reference signals (SRSs) employed in an NR system (NR SRSs) may be used for at least one of the following tasks: channel state information (CSI) acquisition, beam management, and UL-based radio resource management (RRM) measurements for both radio resource control (RRC) RRC_Connected Active and RRC_Connected Inactive states and also UL-based mobility management. The SRS for each UE is configured by the network and the configuration is sent to the UE, for example in a downlink control channel (such as PDCCH). Based on this configuration, UE sends the configured SRS sequences in the configured time-frequency resources. NR SRS configurations may be performed by the network of the NR system (as distinct from the UE), specifically via the central access units and transmit/receive points in the NR system.

Figure 5:
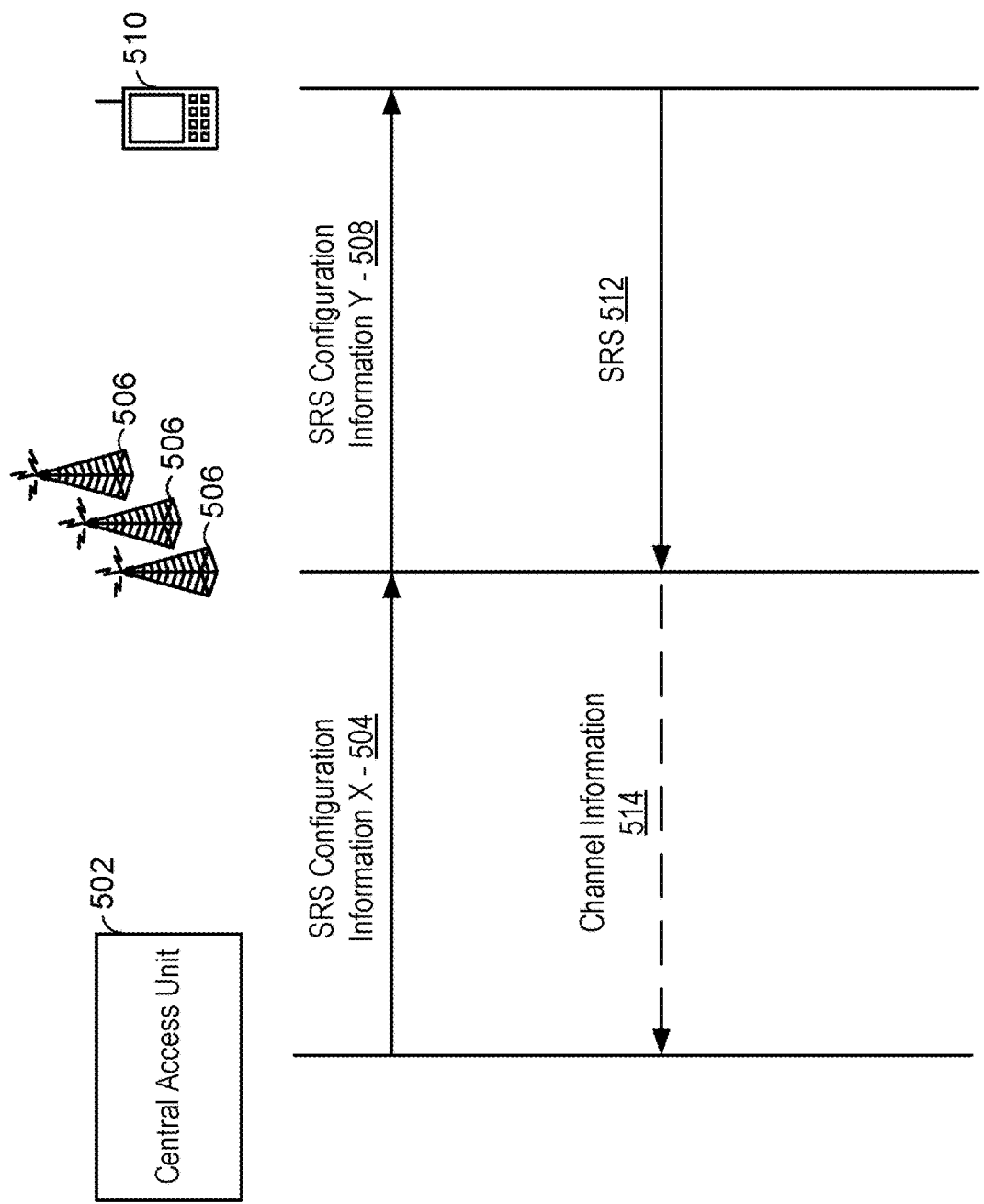
FIG. 5 illustrates the flow of SRS configuration information in a NR network in accordance with an embodiment of the present disclosure.

FIG. 5 illustrates the flow of SRS configuration information in a NR network in accordance with one embodiment of the present disclosure. Referring to FIG. 5, central access unit 502 sends SRS configuration information 504 to transmit/receive points 506 which are part of a NR cell. Transmit/receive points 506 then send SRS configuration information 508 to UE 510. The SRS configuration information 508 may be the same as the SRS configuration information 504 received from central access unit 502, may include information in addition to the SRS configuration information 504, may include less information than the SRS configuration 504, or may be modified as compared to the SRS configuration information 504.

The SRS configuration information 508 is used by UE 510 to generate a SRS 512. The SRS configuration information 504 and/or 508 is used by transmit/receive points 506 to estimate a channel between the UE 510 and one or more of the transmit/receive points 506 using the SRS 512. The channel information 514 estimated from SRS 512 may be sent back to Central Access Unit 502 for further use in operating the NR network.

Note, while three transmit/receive points 506 are shown communicating with UE 510, more or fewer transmit/receive points 506 may be used to wirelessly communicate with the UE 510. NR cell ID and some UE-specific parameters may be used to configure a SRS for each UE by the NR network (e.g. by a central access unit). In one embodiment, some UE-specific SRS configurations may be performed by the UE 510; however, the NR network can overrule this particular configuration. Different SRS configurations may be supported and may be used to carry out different tasks. The different SRS configurations may include, for example, at least one of the following: different bandwidth (SRS may support UL bandwidths of up to at least 80 MHz); different frequency hopping patterns; different transmission combs; different base sequence properties such as base sequence root; different cyclic shifts; different timing, including periodic with different periodicities, aperiodic, or event-driven, and semi-persistent; different CP (cyclic prefix) size and possible guard time; and different numerology (SRS symbol duration and subcarrier spacing for example). Each UE may be assigned multiple SRSs with different configurations at different times in one embodiment.

In some systems, SRSs used in the same NR Cell of a NR system are orthogonal to one another to avoid inter-SRS interference within the NR Cell. Orthogonality can be in time, frequency, or code domains (different comb or cyclic shifts of the same base Zadoff-Chu "ZC" sequence). One problem when such orthogonality is employed is the number of transmission combs or usable cyclically shifted versions of the same ZC sequence (code domain-orthogonal sequences) is limited. As a result, to maintain strict orthogonality among SRSs assigned to all UEs in NR Cell, a large portion of available time and frequency resources may have to be allocated to SRSs of different UEs, which results in a waste of time and frequency resources.

According to one embodiment of the present disclosure, SRS sequences are designed to support a very large number of UEs per NR Cell, including when SRS sequences are used by RRC_Inactive UEs for mobility purposes. Constant Amplitude Zero Auto Correlation (CAZAC) sequences such as ZC sequences can be used as base sequences for SRS. Base ZC sequences used in SRS may be configured by the NR network as described below in more detail.

ZC sequences have been used in LTE to generate SRS due to their constant power profile in time and frequency, mutual orthogonality of cyclically shifted versions of the same ZC sequence, and low cross correlation of two ZC sequences of the same length. We propose to use ZC sequences also in generating NR SRS. In view of the above, in some embodiments of the present disclosure ZC sequences are used for NR SRS sequence design.

In LTE, ZC sequences used to generate LTE SRSs have the following properties:

Property 1: For each SRS length, the following number of ZC roots is available over the whole network:

30 roots for sequence lengths of less than 6 RBs

Property 2: For each SRS length, only one ZC-root is used to generate SRS sequence in each LTE Cell. This root is uniquely determined by an ID $n_{ID}^{RS}$ and may depend on the slot number (may be time varying:

$n_{ID}^{RS}$ equal to LTE Cell ID for SRS

Property 3: Assigned SRSs in a LTE Cell are orthogonal. Inter-SRS orthogonality is preserved in the time/frequency (TF) domain by assigning sequences in different time/frequencies resources (including different transmission combs) or in code domain by using different cyclic shifts of the same base sequence However, to facilitate possible NR operational requirements, at least some of the above properties may need to be modified in NR SRS design. Two possible SRS requirements in NR that the LTE SRS design does not meet are as follows:

NR SRS capacity may need to be far more than that of LTE SRS as the number of UEs in a NR Cell may be far larger than that of a typical LTE Cell.

NR SRS needs to support a more flexible physical resource mapping (PRM). In particular, unlike LTE, allocation of partially overlapping SRSs on the same TF resources in a NR Cell may be possible.

Aspects of the present disclosure provide mechanisms that are intended to address the above two requirements.
Supporting Higher User Capacity The above Property 2 of conventional ZC sequences used in LTE is based on a set of equations in Section 5.5.1 of 3GPP, 36.211 that together determine the ZC root $q_{lte}$ of SRS sequence. Property 2 and this set of equations can be represented in a mathematical form as $$q_{lte}=f(Cell_{ID},L,n_s)$$

where $Cell_{ID}$ is LTE Cell ID, L is the length of SRS sequence and $q_{lte}$ is also a function of $n_s$ only if values of some Boolean high layer signals are properly set.

Property 2 and Eq. (1) indicate that the ZC root used to generate equal-length SRS sequences in the same time slot is cell-specific. This may not lend itself to a SRS design that meets the need for an increased SRS capacity mentioned above, because only a limited number of SRS sequences of the same length can be generated from a single ZC root. This number is upper bounded by the number of allowed cyclic shifts. However, due to the fact that NR SRS may need to support many more UEs (or UE ports) per cell, more than one ZC root may be required to generate SRSs of the same length on the same OFDM symbol. This can be done if the ZC roots of NR SRS sequences are configured UE-specifically.

In view of the above, some embodiments of the present disclosure provide a mechanism by which SRS sequence roots are configured UE-specifically, as discussed in further detail below.

Sequence ID has been proposed to configure SRS sequences and the ongoing standards discussions related to NR have agreed that NR should support configurable SRS sequence ID by UE specific configuration if SRS sequence ID is supported. The use of UE-specific or UE group-specific SRS sequence IDs is an effective approach to configure ZC root of SRS sequence for each UE and is also a step forward from LTE-A wherein $n_{ID}^{RS}$ is introduced to determine ZC root of SRS sequence but was only equal to LTE Cell ID in the LTE SRS design. In some embodiments of the present disclosure, the used ZC root is dependent on the SRS sequence length so that the number of available ZC roots increases with the length of SRS sequences. This avoids the use of only a fixed set of a limited number of ZC roots for all different SRS sequence lengths. Moreover, ZC root of SRS sequence can also depend on the SRS scheduled time (OFDM symbol and/or time slot) for randomization purposes in some embodiments of the present disclosure. In some embodiments, this dependency may be enabled or disabled by the network through high layer signaling, e.g., L2/L3, RRC signaling. Therefore, in its most general form, we have $$q_{nr}=g(\text{seq\_ID},L,t)$$

where $q_{nr}$ is ZC root of NR SRS sequence, seq_ID is a UE-specific or UE group-specific sequence ID, and t is the SRS sequence scheduled time.

In view of the above, in some embodiments of the present disclosure UE-specific SRS sequence IDs are supported and the ZC root of SRS sequence is at least a function of SRS sequence ID and SRS sequence length and, in some embodiments, can also depend on the SRS scheduled time.

In some embodiments, the UE-specific SRS sequence ID may also be used to determine other SRS sequence configuration parameters such as sequence length, scheduling time, and cyclic shifts. In such a case, L and t in Eq. (2) may also depend on $seq_{ID}$ and possibly some higher layer signals.

In some embodiments, in order to UE-specifically configure SRS sequence ID, it is linked with a UE-specific ID that is already known to the UE so that a UE can determine its SRS sequence ID based on its already known UE-specific ID, e.g. UE Cell-Radio Network Temporary Identifier (C-RNTI). A potential advantage of such an approach is that it may reduce the overhead of sending SRS sequence ID to the UE as the UE is aware of its own UE-specific ID and can determine its SRS sequence ID accordingly.

SRS sequence ID can also be determined as a function of UE-specific ID (like C-RNTI). Alternatively, C-RNTI or function of it or a part of it can be the default value of UE-specific SRS sequence ID unless overridden by higher layer signaling.

Due to the need to support more UE ports, in contrast to LTE, multiple ZC roots may be used in the same cell to generate the same SRS sequence length in some embodiments of the present disclosure. As such, the above Property 1 of conventional ZC sequences used in LTE may have to be modified to support more sequence roots in some embodiments of the present disclosure. In particular, the network may require more than 30 (or 60) roots to flexibly assign ZC roots to different groups of UEs over the whole network. Note that larger number of ZC roots is available to generate SRS sequences of larger lengths for sounding larger bandwidths. This larger pool of available ZC roots can be utilized to more flexibly assign ZC sequences to UEs.

In view of the above, in some embodiments of the present disclosure more than 60 ZC roots are supported at least for each SRS sequence length larger than a threshold length.
Supporting More Flexible Physical Resource Mapping (PRM)

Providing more PRM flexibility is an important requirement for NR SRS. To address this requirement, a different design approach from LTE has been proposed in which SRS sequences are determined by PRM position as well as SRS bandwidth. One adverse effect of such a design approach is that it typically results in higher Cubic Metric (CM)/Peak-to-Average Power Ratio (PAPR) values. Embodiments of the present disclosure that provide mechanisms to provide more PRM flexibility than that of conventional LTE without resorting to a PRM position dependent design approach are discussed below.

In LTE, higher layer cell-specific parameter srs-BandwidthConfig, $C_{SRS} \in \{0,1,2,3,4,5,6,7\}$ and UE-specific parameter srs-Bandwidth $B_{SRS} \in \{0,1,2,3\}$ determine the allowed SRS bandwidths in a Cell. For each $C_{SRS}$, only four different SRS bandwidths are allowed each of which corresponding to a $B_{SRS} \in \{0,1,2,3\}$. Moreover, $BW(SRS_i)=k \cdot BW(SRS_{i+1})$ where $BW(SRS_i)$ is the bandwidth of SRS corresponding $B_{SRS}=i$ and $k \in \{1,2,3,4,5,6\}$. Finally, PRM of the allowed four SRS bandwidths follows a specific nested structure in which PRM of k $SRS_{i+1}$ should be fully covered by PRM of $SRS_i$.

Figure 6:
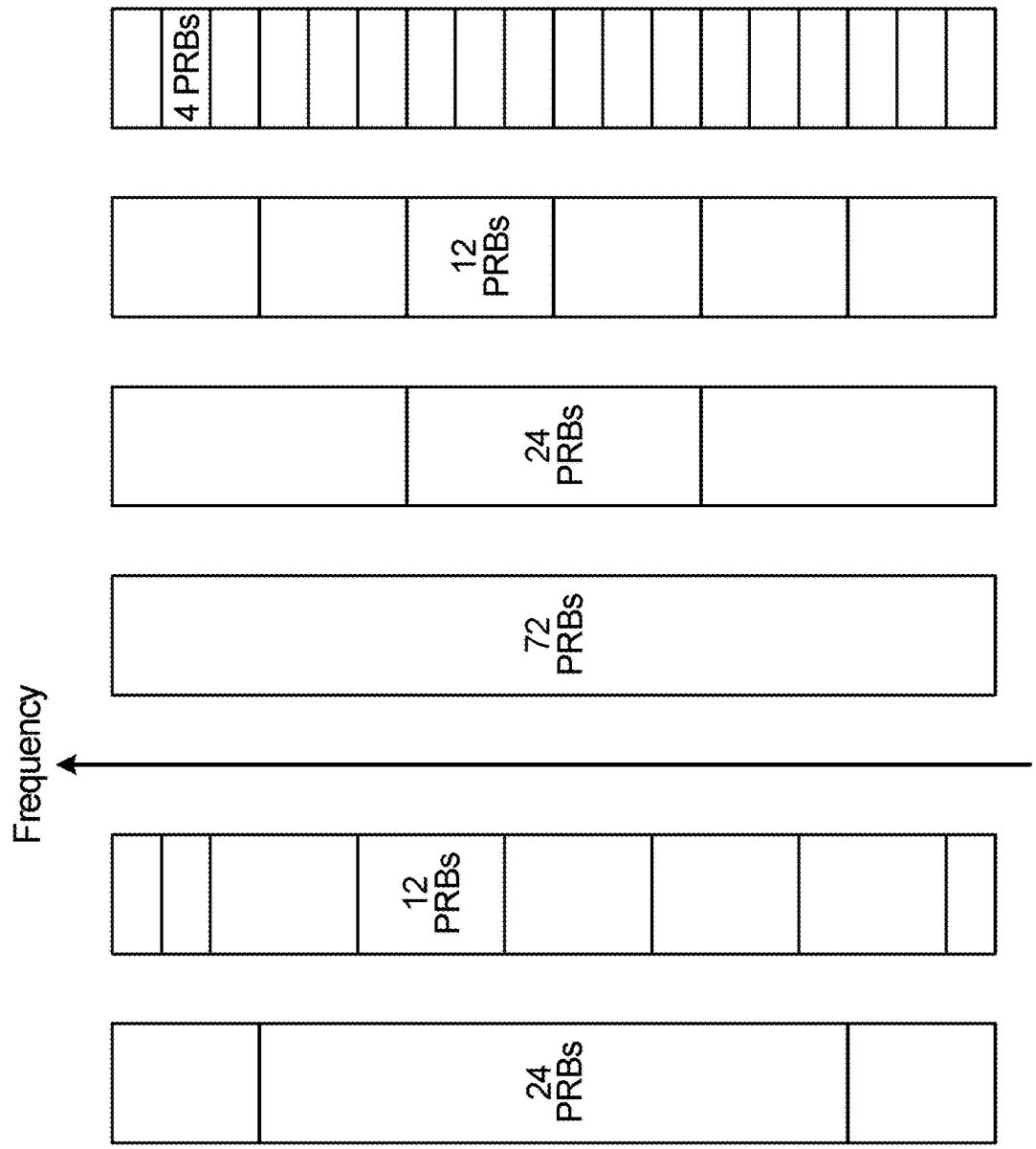
FIG. 6 illustrates examples of allowed (right of the frequency axis) and not allowed (left of the frequency axis) SRS physical resource mapping in LTE.

FIG. 6 is a diagram illustrating examples of allowed (right of the frequency axis) and not allowed (left of the frequency axis) SRS physical resource mapping in LTE for $60<N_{RB}^{UL} \leq 80$ and $C_{SRS}=0$.

The PRMs at the right hand side of the frequency axis in FIG. 6 show the allowed PRMs in LTE for the case of $60<N_{RB}^{UL} \leq 80$ and $C_{SRS}=0$. In turn, PRMs at the left hand side of FIG. 6 give an example of PRMs that are not allowed in LTE wherein the PRM of 12 PRB SRSs do not follow the nested PRM structure enforced in LTE.

To provide more PRM flexibility compared to LTE, some embodiments of the present disclosure include the following modifications:

The limited allowed SRS bandwidths per cell that are enforced by cell-specific $C_{SRS}$ and UE-specific $B_{SRS}$ can be relaxed. In some embodiments, the number of allowed SRS bandwidths is network configurable. One approach to provide more flexibility in allowed SRS bandwidths per cell is to substitute cell-specific $C_{SRS}$ with a UE-group specific ID and/or increases the number of allowed values for $B_{SRS}$.

Orthogonality among SRSs in time/frequency or code domains can still be maintained without the use of nested PRM structure in LTE. As such, the nested PRM structure in LTE can be relaxed in some embodiments of the present disclosure.

SRS Resource Pooling

Figure 7:
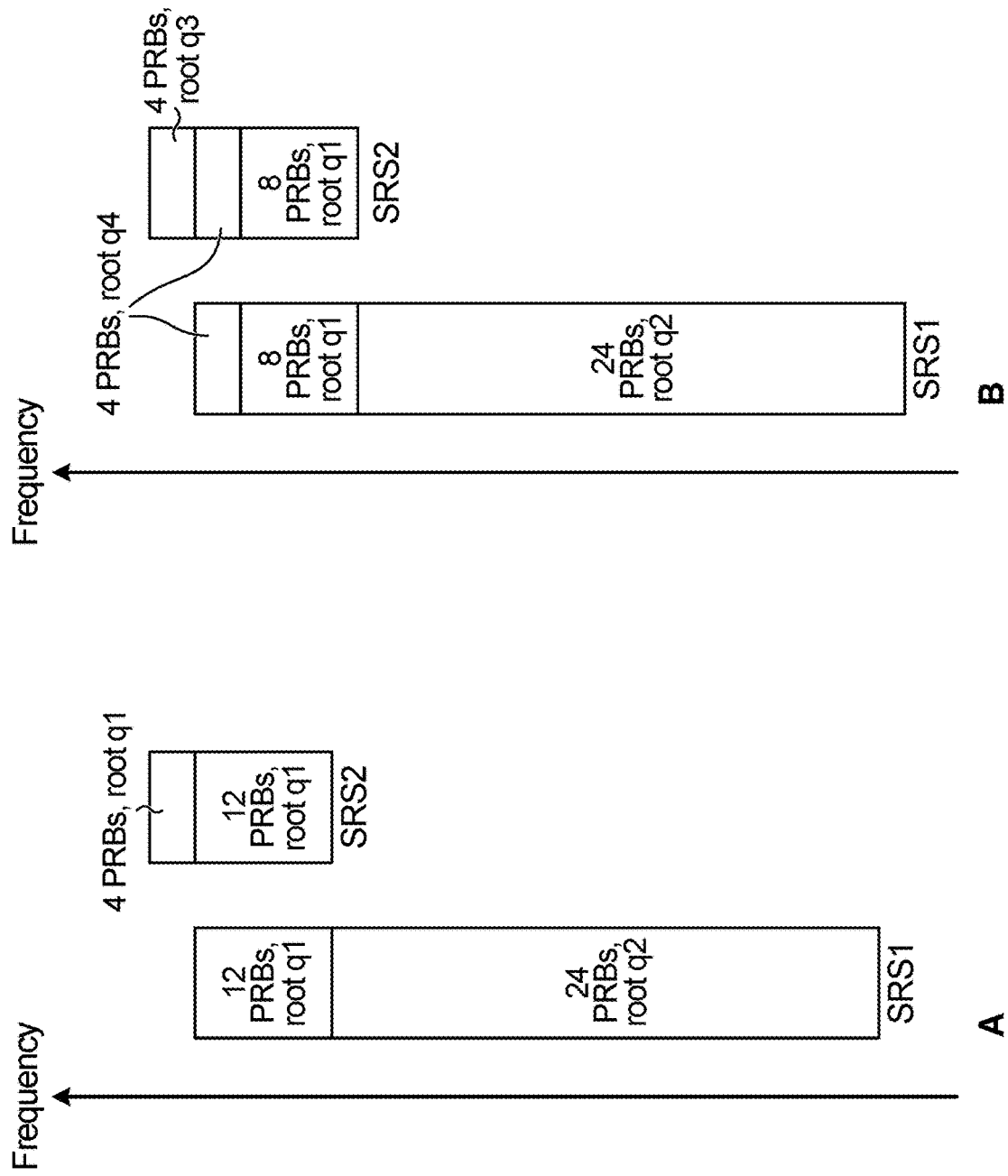
FIG. 7 illustrates examples of SRS resource pooling in accordance with an embodiment of the present disclosure.

Another approach to provide more PRM flexibility is to use SRS resource pooling to facilitate code domain orthogonality between two partially overlapped SRSs that are scheduled on the same time resources. FIG. 7 show two examples (examples A and B) of such SRS resource pooling.

SRS1 and SRS2 in example A of FIG. 7 are scheduled on the same time resources and assumed to have the same transmission comb. SRS1 is comprised of two concatenated ZC sequences that cover 12 and 24 PRBs while SRS2 is comprised of two ZC sequences that cover 4 and 12 PRBs. The overlapped part of SRS1 and SRS2 is the 12 PRB section in example A. To maintain code-domain orthogonality between SRS1 and SRS2 the ZC sequences corresponding to the overlapped 12 PRB section can be derived from the same ZC root with different cyclic shifts.

In example B of FIG. 7, the overlapped part of SRS1 and SRS2 includes two sets of ZC sequences covering 4 PRBs and 8 PRBs wherein the equal-size ZC-sequence building blocks in the overlapped part are derived from the same ZC roots with different cyclic shifts to preserve orthogonality.

The idea of concatenating short ZC-sequences as building blocks of SRS sequences has been previously proposed as an approach to PRM position dependent SRS design. In particular, the previous proposal also proposes that overlapping parts of two SRSs should be generated from the same ZC-root. However, the SRS resource pooling approach in accordance with the present disclosure and the PRM position dependent designs previously proposed differ in at least the following aspects:

The ZC building blocks of resource pooled SRS sequences of the present disclosure are not PRM position dependent. In particular, SRS1 and SRS2 can be scheduled on any part of the UL system bandwidth without any change in their building blocks. In embodiments of the present disclosure the network configures these ZC building blocks with the view that the overlapped part of two resource pooled SRS sequences SRS1 and SRS2 include the same set of one or a concatenation of multiple ZC sequence building blocks except that the used cyclic shifts in the building blocks of the overlapped part of SRS1 and SRS2 are different (e.g., see FIG. 7). This guarantees orthogonality between SRS1 and SRS2.

Unlike in PRM position dependent SRS designs wherein SRS sequences are typically derived from concatenating a fixed size ZC-sequence building blocks, the overlapping part of resource pooled SRS sequences in accordance with the present disclosure is network configured and can include one larger or a concatenation of several smaller ZC-sequences.

Unlike in PRM position dependent SRS designs wherein all SRSs comprise a concatenation of smaller uniform size ZC building blocks, resource pooled SRSs in accordance with the present disclosure may only be used if it is necessary to provide code-domain orthogonality between two partially overlapped SRSs.

In view of the above, it is noted that some embodiments of the present disclosure provide resource pooled SRS sequences that include more than one ZC building block. Furthermore, these building blocks may not be resource allocation position dependent and/or may have different sizes.

The following provides an illustrative example of how resource pooled SRS sequences may be generated in accordance with an embodiment of the present disclosure. If we let SRS1 and SRS2 be two partially overlapped resource pooled SRS sequences and ZC1,1, ZC1,2, . . . , ZC1,K and ZC2,1, ZC2,2, . . . , ZC2,L be the sets of ZC building blocks of SRS1 and SRS2 respectively such that ZCi,m−1 is immediately located on the PRBs on top of ZCi,m for i=1,2 and m∈1, 2, . . . , K. Then,

K=L

ZC1,m and ZC2,m have the same root for m∈1, 2, . . . , K.

ZC1,m and ZC2,m have different cyclic shifts for m∈1, 2, . . . , K.

Non-Orthogonal SRS Assignment

In some embodiments of the present disclosure, the base sequence of a given SRS can depend on the NR Cell ID that is shared among multiple transmit/receive points in the NR cell. By way of comparison, the base ZC sequence in a conventional LTE SRS is determined based on the unique ID of its serving cell. As previously noted the serving transmit/receive point (which can be a set or subset of one or more transmit/receive points) is transparent to the UE in a NR system, and multiple transmit/receive points in an NR cell share the same NR Cell ID (RRC level mobility). In one embodiment, a base ZC sequence may be UE or UE-group specific.

Given that maintaining strict orthogonality among all SRSs used in a NR Cell may result in a waste of time and frequency resources and may not be necessary, according to one embodiment a NR system is able to configure SRSs, using correlated sequences, for use by different UEs in the same NR cell, using the same or at least partially overlapping resources. In some implementations, the correlated sequences may be chosen so as to have a level of correlation below a threshold level of correlation. Alternatively, the chosen sequences may have a lower correlation compared to other available sequences.

The transmit/receive points 506 that receive the SRS Configuration information 504 need not be the same set as the transmit/receive points 506 that receive the SRS 512 from the UE 510. However, the SRS configuration information 504 must be received by a transmit/receive point (one of 506) for use in channel estimation.

In an optional operation/system, information about non-orthogonal SRSs that share same time and frequency resources are included in the SRS configuration information 504. Information regarding the non-orthogonal SRSs can be used by the transmit/receive points 506 for channel estimation. In prior systems, SRS signals of non-subject UEs (subject UE is the UE for which channel estimation is being performed) were considered part of system noise, even though these non-subject SRS signals were not actually system noise. With the optional embodiment, non-orthogonal SRS signals from non-subject UEs (that are known to a transmit/receive point performing channel estimation) are identified in the SRS configuration information 504 and may be considered when estimating a channel between a transmit/receive point 506 and the subject UE 510.

Figure 8:
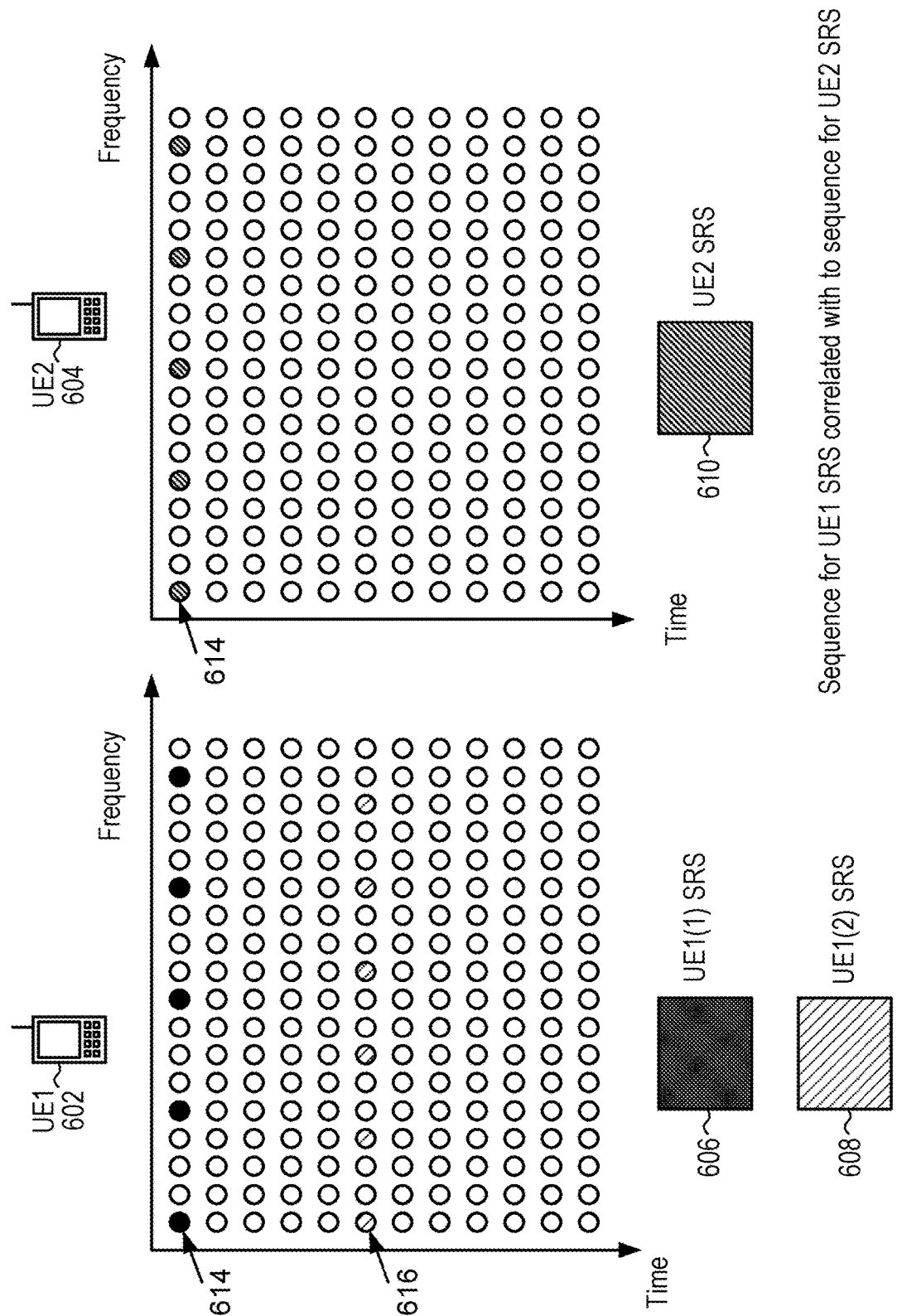
FIG. 8 illustrates SRSs being sent in a NR network in accordance with an embodiment of the present disclosure.

FIG. 8 illustrates SRSs being sent in a NR network in accordance with an embodiment the present disclosure. In FIG. 8, UE1 602 and UE2 604 are operating within a common NR cell. SRS 606 is transmitted by UE1 602 on time and frequency resources 614 indicated, and SRS 610 is transmitted by UE2 604 on the same time and frequency resources 614, while the sequence used for SRS 610 is not orthogonal to the sequence used for SRS 606 but rather correlated. Also, shown in FIG. 8 is UE 602 transmitting another SRS 608 having a different sequence length from SRS 606 in a later symbol using time and frequency resource 616 as indicated.

As noted above, NR SRSs generated by ZC-sequences from two or more different roots may be used in the same, or partially overlapping, time and frequency resources in an NR Cell. According to one embodiment of operation orthogonal ZC-sequences (from the same root with different cyclic shifts and/or comb or from two different roots using two different combs) are assigned to UEs that would inflict more interference to one another, whereas low correlated ZC-sequences (sequences from two different roots having a partial correlation below a given threshold for example) can be assigned to UEs that inflict less or no interference to one another in comparison, in both cases using at least partially overlapping time and frequency resources in an NR cell.

Figure 9:
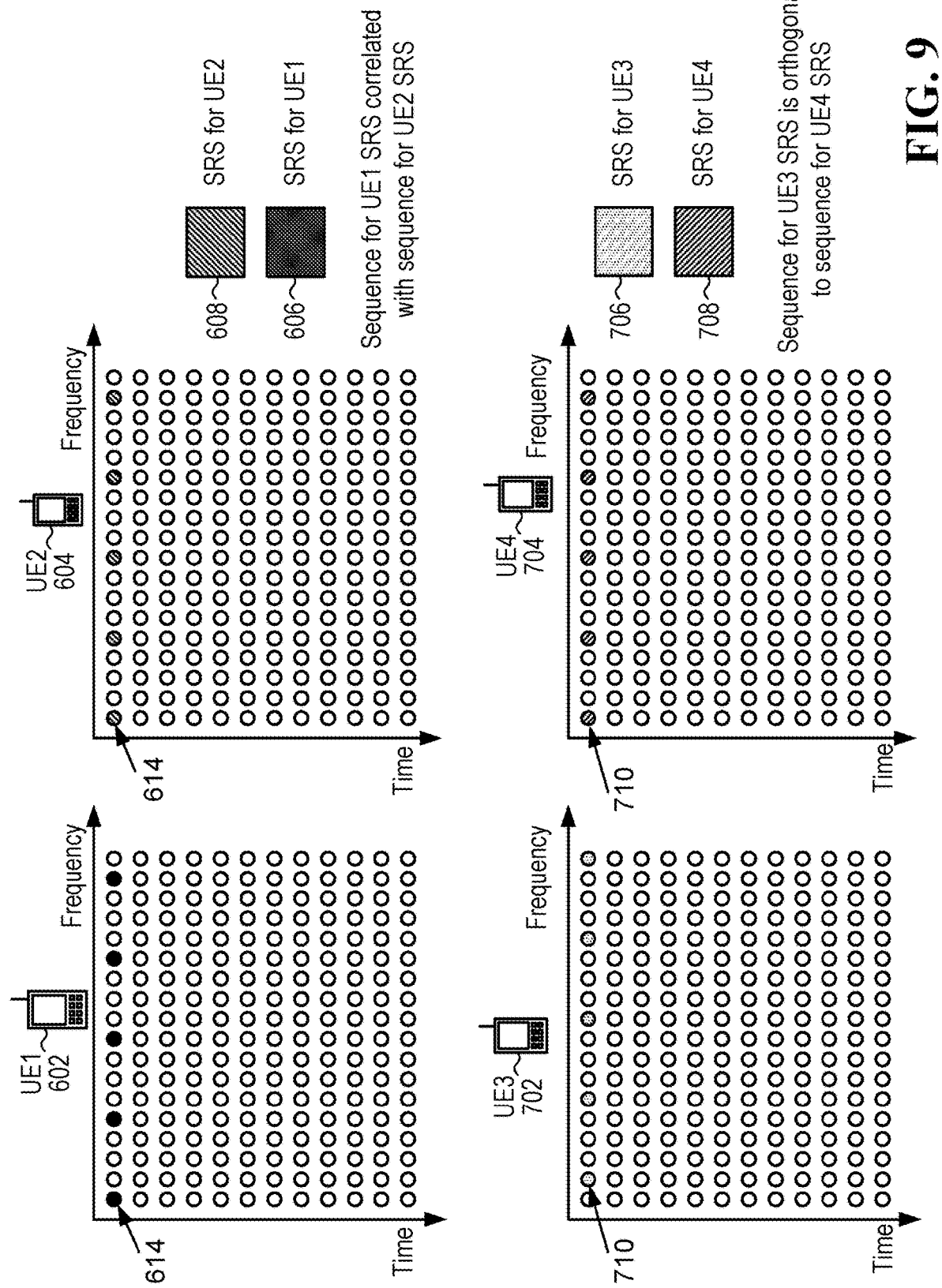
FIG. 9 illustrates SRSs being sent in a NR network in accordance with an embodiment of the present disclosure.

FIG. 9 illustrates SRSs being sent in a NR network in accordance with an embodiment of the present disclosure. With the embodiment of FIG. 9, UE1 602, UE2 604, UE3 702, and UE4 704 are operating within a common NR cell. In addition to the SRS 606 and SRS 608 of FIG. 8, which are based on correlated sequences, UE3 702 and UE4 704 transmit SRS 706 and SRS 708 on the same time and frequency resources 710, which are different from time and frequency resources 614 used for the SRSs that are based on orthogonal sequences. As will be appreciated by one of skill in the art, SRS 706 and SRS 708 need not be in the same symbol period as SRS 606 and SRS 608 and could be in a different symbol period.

As noted above, NR SRSs of UEs may be configured by the network. Unlike with LTE, this SRS configuration does not depend on individual LTE Cell IDs, but rather on a common NR Cell ID used by a set of transmit/receive points. According to one embodiment, more than 30 (or 60) ZC roots may be available over the whole network for each NR SRS sequence length. By comparison, in LTE currently, only 30 roots are available for the SRS sequences of length of less than 72 and, depending on the configuration, 30 or 60 roots are available for sequences of length larger than 72. Also by way of comparison to LTE, more than one ZC root for each NR SRS sequence length may be used at each NR Cell at any given slot in an embodiment. It is explicitly understood that these available roots may vary with time. According to one embodiment, the sequence hopping is network configurable and may not necessarily follow the current LTE approach.

As discussed above, in some embodiments an SRS resource that is configured for a UE may include multiple SRS sequences (e.g., two or more concatenated ZC sequences), each of which may be mapped to one distinct OFDM symbol in a slot. Furthermore, in some embodiments, each SRS sequence may be a function of a different sequence root. As such, in some embodiments, each SRS resource may include multiple SRS sequences (that may have different sequence roots) that are respectively mapped to multiple OFDM symbols in a slot. It is noted that in such embodiments the roots used to generate SRS sequences for different OFDM symbols of the SRS resource may be different only when SRS sequence hopping is enabled.

Figure 10:
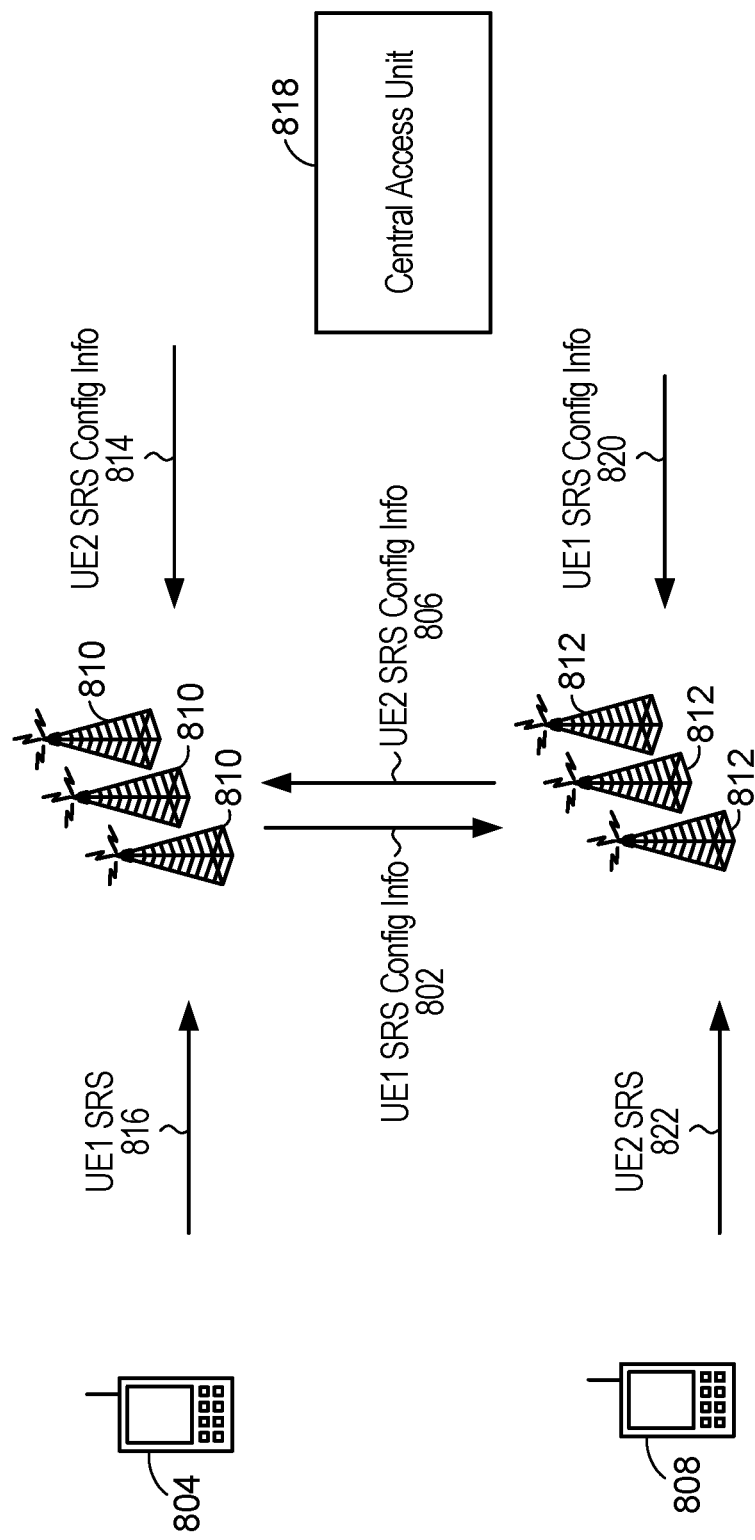
FIG. 10 illustrates SRS configuration information being exchanged within a NR cell in accordance with an embodiment of the present disclosure.

FIG. 10 illustrates SRS configuration information being exchanged within a NR cell in accordance with an embodiment of the present disclosure. As shown in FIG. 10, UE1 SRS configuration information 802 about UE1 804 associated with one set of one or more transmit/receive points 810 is shared with another set of one or more transmit/receive points 812 associated with UE2 808 to aid in estimating a channel between the UE2 808 and one or more of the transmit/receive points 812. Similarly, UE2 SRS configuration information 806 about UE2 808 may be shared with transmit/receive points 810 to aid in estimating a channel between UE1 804 and one of the transmit/receive points 810 based upon UE1 SRS 816.

Though not shown in FIG. 10, transmit/receive points 81*o* and 812 use the SRS configuration information 802 and 806 for SRS 816 and SRS 806, respectively, to estimate channels for UE1 804 and UE2 808, based on SRS 816 and SRS 806, respectively. The SRS configuration information 802 and 806 may be obtained in the manner shown in FIG. 5, for example.

In prior systems, the SRSs of other UEs were considered noise when estimating a channel for a subject UE. However, with the NR network of FIG. 10, SRS configuration information known of other interfering UEs that share at least a portion of time and frequency resources with a subject UE may be used to improve one or more channel estimates for the subject UE. For example, in processing the UE1 SRS 816 it receives for estimation, the transmit/receive point 810, in a channel estimation process for a channel between UE1 804 and the transmit/receive point 810, attempts to remove the interfering affect that UE2 SRS 822 has on the received signal. Likewise, transmit receive point 812, in a channel estimation process for a channel between UE2 808 and the transmit/receive point 812, attempts to remove the interfering affect that UE1 SRS 816 has on the received signal. While one interfering UE is shown to inflict interference on the subject UE, it is expressly contemplated that any number of interfering UEs may be provided in the NR network if applied.

The transmit/receive points 810 and 812 need not be entirely distinct for each NR cell and may partially overlap. The UE1 SRS configuration information 802 and the UE2 SRS configuration information 806 may be shared either directly between the transmit/receive points 810 and 812 or shared via the central access unit 818 as shown in FIG. 10. When shared via the central access unit 818, the UE2 SRS configuration information 814 may be the same or differ from the UE2 SRS configuration information 806 and the UE1 SRS configuration information 820 may be the same or differ from UE1 SRS configuration information 802.

According to another optional embodiment, Neighboring NR Cells, can share information (semi-statistically or dynamically) about their assigned NR SRSs to reduce inter SRS interference effect at cell-edges. For example, interference mitigation/avoidance/reduction schemes can be used to reduce inter-NR cell inter-SRS interference.

Figure 11:
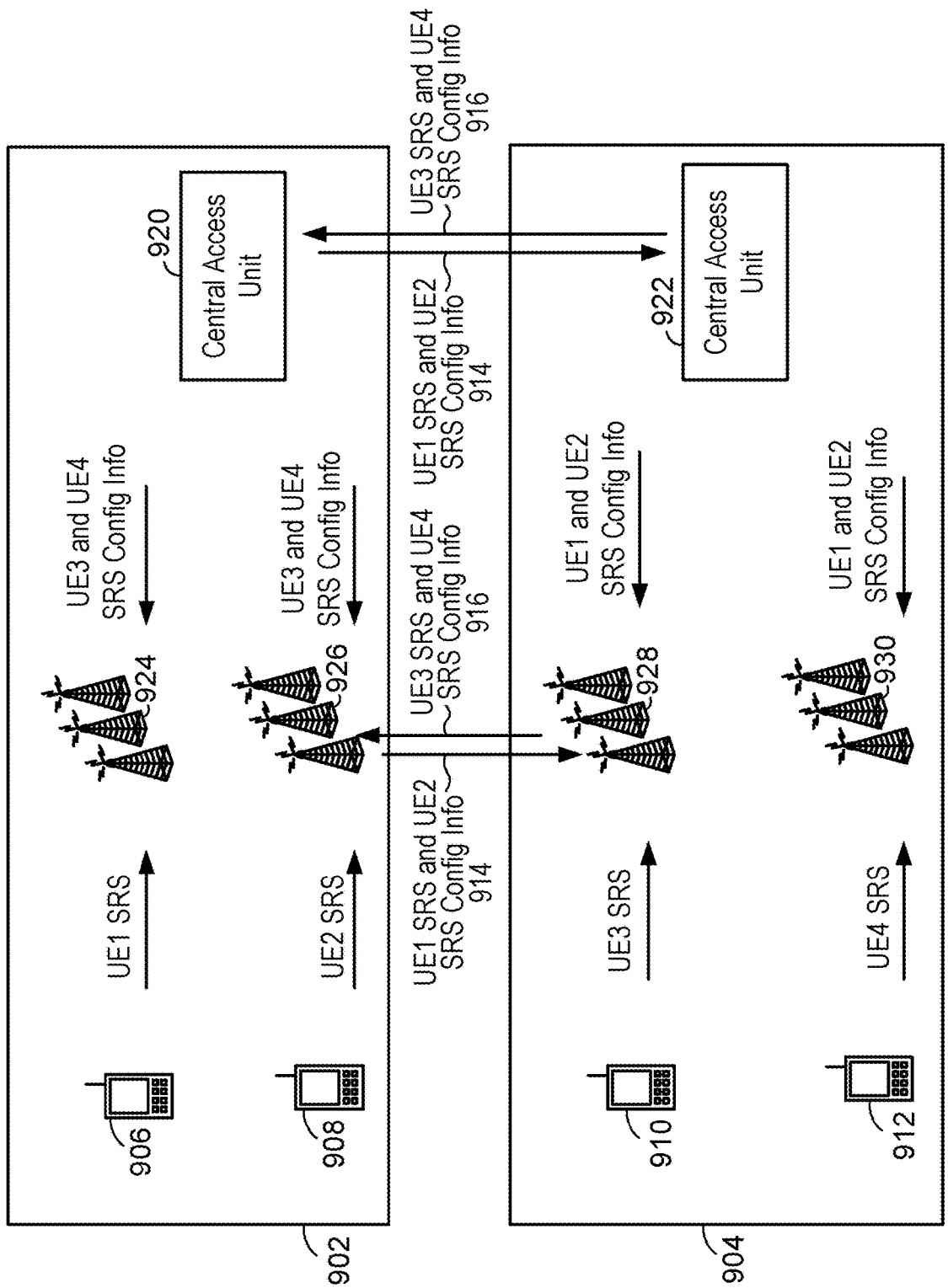
FIG. 11 illustrates SRS configuration information being exchanged between NR cells in accordance with an embodiment of the present disclosure.

FIG. 11 illustrates SRS configuration information being exchanged between NR cells in accordance with an embodiment of the present disclosure. As shown in FIG. 11, SRS configuration information 914 associated with UE1 906 and UE2 908 in one NR cell 902 is shared with a neighboring NR cell 904 either via one or more central access units 920 and 922, or directly between one or more transmit/receive points 924, 926, 928 and 930. The SRS configuration information 914 regarding UE1 906 and UE2 908 may be used to assist in the estimation of channels for UE3 910 and UE4 912 in a channel estimation process. Similarly, SRS configuration information 916 associated with UE3 910 and UE4 912 in NR cell 904 is shared with a neighboring NR cell 902 either via one or more central access units 920 and 922, or directly between one or more transmit/receive points 924, 926, 928 and 930. The SRS configuration information 916 regarding UE3 910 and UE4 912 may be used to assist in the estimation of channels for UE1 906 and UE2 908 in a channel estimation process. While FIG. 11 shows two central access units 920 and 922, each set of transmit/receive points shown therein could be connected to the same central access unit 920 or 922.

For example, the SRS signals of other interfering UEs, e.g., UE3 910 and/or UE4 912, that share time and frequency resources with a subject UE, e.g. UE 2 908, may inflict interference on the UE2 SRS that UE2 908 transmits and that is received by transmit/receive point 926. When estimating the channel of the subject UE2 908 based upon the received UE2 SRS signal, transmit/receive point 924, with knowledge of UE3 SRS and UE4 SRS, may remove or mitigate the interfering effect that UE3 SRS and/or UE4 SRS contribute in the received SRS signal, thereby improving one or more channel estimations of the subject UE2 908.

Further, the SRS signals of other interfering UEs, e.g., UE1 906 and/or UE2 908, that share time and frequency resources with a subject UE, e.g. UE3 910, may inflict interference on the UE3 SRS that UE3 910 transmits and that is received by transmit/receive point 928. When estimating the channel of the subject UE3 910 based upon the received UE3 SRS signal, transmit/receive point 928, with knowledge of UE1 SRS and UE2 SRS configuration information, may remove or mitigate the interfering effect that UE1 SRS and/or UE2 SRS contribute in the received SRS signal, thereby improving one or more channel estimations of the subject UE3 910. It is also expressly understood that any other SRS configuration information from any other interfering UEs that is within the same NR cell as the subject UE3 910 may also be used to assist in estimating the channel of UE3 910. While one or two interfering UEs are shown to inflict interference on the subject UE, it is expressly contemplated that any number of interfering UEs may operate in the NR network that may cause interference.

In another optional embodiment, NR SRS sequences with different lengths can be used in a NR cell in different symbols. The roots associated with each NR SRS length may be configured by network and need not follow the LTE approach (note again that only one ZC root for each LTE SRS sequence length may be used at each LTE Cell at a given slot.) Inter and intra-NR Cell inter-SRS interference considerations may be taken into account to select the roots for each NR SRS length.

As noted above with respect to FIG. 10, optional intra-NR cell NR SRS interference treatment may be employed with the NR cells of FIG. 11 as well. Because SRSs are configured by the NR network, resulting inter-SRS interference in ah NR cell may be addressed in a number of ways. Using network planning, UE SRSs within NR cells may be planned so that the total inter-SRS interference on each NR SRS meets a threshold level. Such planning is possible by assigning SRSs in the same time and frequency resources by an NR Cell via one or multiple cooperating gNbs. Another embodiment of network planning involves correlated NR SRSs that are assigned in the same time and frequency resource being used in two different parts of the NR Cell. For instance, two low-correlated SRSs in the same time and frequency resources are allocated to two UEs that do not share the same serving transmit/receive point set in NR Cell. In yet another embodiment, the network uses NR SRS power control over an NR Cell to manage inter-SRS interference at the network side, for example as part of the SRS configuration information.

Since different UEs' SRSs within an NR Cell are configured by the NR Cell, interfering SRS sequences are known at the network side and their effect can be mitigated using a proper channel estimation design that can take into account the interfering SRS sequence. Network cooperated estimation techniques may include cooperative UL channel estimation by multiple transmit/receive points in NR Cell to improve inter-SRS interference mitigation.

Optional inter-NR Cell NR SRS interference treatment may also be used with the embodiments above. Active or passive techniques, or a combination of both, can be used for compensating for Inter-NR Cell SRS interference. Active techniques may include neighboring NR Cells sharing information about the NR SRSs that are used. Such information may further include NR SRS sequences and/or transmission power that is used within the NR cell. Information may also be used for interference mitigation/cancellation techniques in the neighboring NR Cells. For instance, interfering SRS configuration information may be taken into account in a channel estimation algorithm/filter to mitigate/cancel the interference and scheduling two NR Cell-edge UEs in neighboring NR Cells with high mutual interference in the same time/frequency resources is avoided. Passive techniques can include assigning to NR cell-edge UEs NR SRS's having low correlations with the NR SRS used at the neighboring NR Cells. This can be done, for instance, using low cross-correlated ZC roots at neighboring NR Cells.

If multiple roots are used in an NR Cell in overlapping time and frequency resources, the number of available NR SRS resources are typically much more than the required number of NR SRS resources in an NR Cell. However, the number of available NR SRS resources in a NR Cell can be further increased by increasing NR SRS time-frequency resources allocation or increasing the number of allowed cyclic shifts of ZC-sequences from the same root. More than 8 cyclic shifts per ZC-sequence may be a viable choice in dense NR environment wherein the maximum channel dispersion length between UE and its serving transmit/receive point set is typically small.

Figure 12:
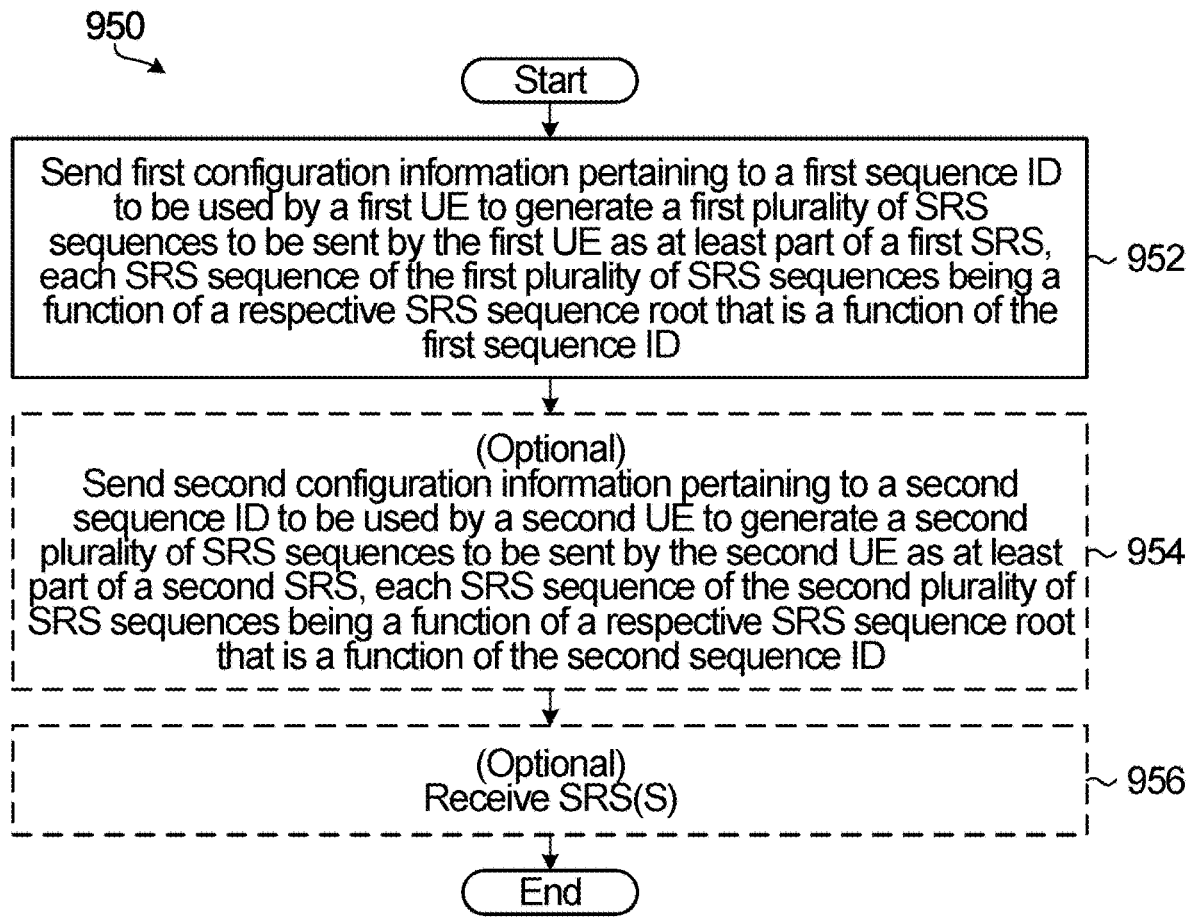
FIG. 12 illustrates a process of provisioning SRSs in a network in accordance with an embodiment of the present disclosure.

FIG. 12 illustrates a flow diagram of example operations 950 in a TRP for assigning sounding reference signals in a wireless communication network according to example embodiments described herein.

In block 952, the TRP sends first configuration information pertaining to a first sequence ID to be used by a first UE to generate a first plurality of SRS sequences to be sent by the first UE as at least part of a first SRS, each SRS sequence of the first plurality of SRS sequences being a function of a respective SRS sequence root that is a function of the first sequence ID. Optionally, in block 954, the TRP sends second configuration information pertaining to a second sequence ID to be used by a second UE to generate a second plurality of SRS sequences to be sent by the second UE as at least part of a second SRS, each SRS sequence of the second plurality of SRS sequences being a function of a respective SRS sequence root that is a function of the second sequence ID. Optionally, in block 956, the TRP receives an SRS from one or more of the UEs.

The example operations 950 are illustrative of an example embodiment. Various ways to perform the illustrated operations, as well as examples of other operations that may be performed, are described herein. Further variations may be or become apparent.

For example, in some embodiments, the first configuration information may include information to selectively enable or disable dependence of the SRS sequence roots on an SRS sequence scheduling time.

In some embodiments, the SRS sequence scheduling time has an OFDM symbol time granularity.

In some embodiments, the first plurality of SRS sequences are to be sent by the first UE in respective OFDM symbol intervals within a time slot.

In some embodiments, the first sequence ID overrides a default sequence ID.

In some embodiments, the default sequence ID for the first UE is a function of a UE-specific ID associated with the first UE.

In some embodiments, the first sequence IDs is a function of a UE-specific ID associated with the first UE.

In some embodiments, the UE-specific ID associated with the first UE is a C-RNTI associated with the first UE.

In some embodiments, the first sequence ID is a function of a UE group-specific sequence ID that is assigned to a UE group to which the first UE belongs.

In some embodiments, the first plurality of SRS sequences are to be sent by the first UE as at least part of the first SRS using a first time and frequency resource, the second plurality of SRS sequences are to be sent by the second UE as at least part of the second SRS using a second time and frequency resource, and the first time and frequency resource at least partially overlaps with the second time and frequency resource.

In some embodiments, the operations 950 may further include sending first physical resource mapping configuration information pertaining to a first allowed number of SRS bandwidths to be used by the first UE for physical resource mapping of the first SRS, and sending second physical resource mapping configuration information pertaining to a second allowed number of SRS bandwidths to be used by the second UE for physical resource mapping of the second SRS.

In some embodiments, the operations 950 may further include sending third configuration information pertaining to a third sequence ID to be used by the first UE to generate a third plurality of SRS sequences to be sent by the first UE as at least part of the first SRS, each SRS sequence of the third plurality of SRS sequences being a function of a respective SRS sequence root that is a function of the third sequence ID.

Figure 13:
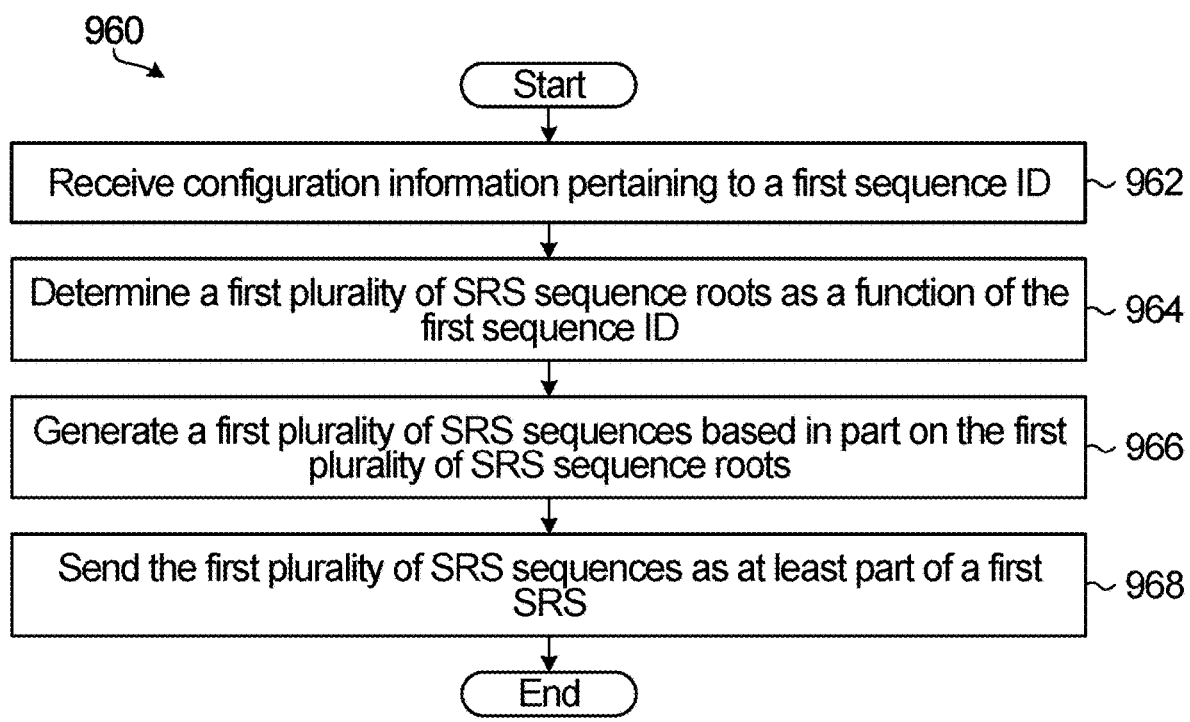
FIG. 13 illustrates a process of generating SRSs at a UE in accordance with an embodiment of the present disclosure.

FIG. 13 illustrates a flow diagram of example operations 960 in a UE for generating sounding reference signals in a wireless communication network according to example embodiments described herein.

In block 962, the UE receives configuration information pertaining to a first sequence ID. In block 964, the UE determines a first plurality of SRS sequence roots as a function of the first sequence ID. In block 966, the UE generates a first plurality of SRS sequences based in part on the first plurality of SRS sequence roots. In block 968, the UE sends the first plurality of SRS sequences as at least part of a first SRS.

The example operations 960 are illustrative of an example embodiment. Various ways to perform the illustrated operations, as well as examples of other operations that may be performed, are described herein. Further variations may be or become apparent.

For example, in some embodiments of the third aspect, the first configuration information includes information to selectively enable or disable dependence of the SRS sequence roots on an SRS sequence scheduling time.

In some embodiments, the SRS sequence scheduling time has an OFDM symbol time granularity.

In some embodiments, sending the first plurality of SRS sequences as at least part of a first SRS includes sending the first plurality of SRS sequences in respective OFDM symbol intervals within a time slot.

In some embodiments, the first sequence ID overrides a default sequence ID.

In some embodiments, the default sequence ID for the UE is a function of a UE-specific ID associated with the UE.

In some embodiments, the first sequence ID is a function of a UE-specific ID associated with the UE.

In some embodiments, the UE-specific ID associated with the UE is a C-RNTI associated with the UE.

In some embodiments, the first sequence ID is a function of a UE group-specific sequence ID that is assigned to a UE group to which the UE belongs.

In some embodiments, the first SRS is to be sent by the UE using a first time and frequency resource that at least partially overlaps with a second time and frequency resource used by a second UE to send a second SRS, wherein the UEs are served by respective subsets of at least one transmit/receive point in the same cell.

In some embodiments, sending the first plurality of SRS sequences as at least part of the first SRS includes mapping the first plurality of SRS sequences to physical resources based on a network configurable number of allowed SRS bandwidths.

In some embodiments, the operations 960 further include determining, at the UE, the number of allowed SRS bandwidths based on a UE-specific ID associated with the UE or a UE group-specific ID associated with a UE group to which the UE belongs.

Figure 14:
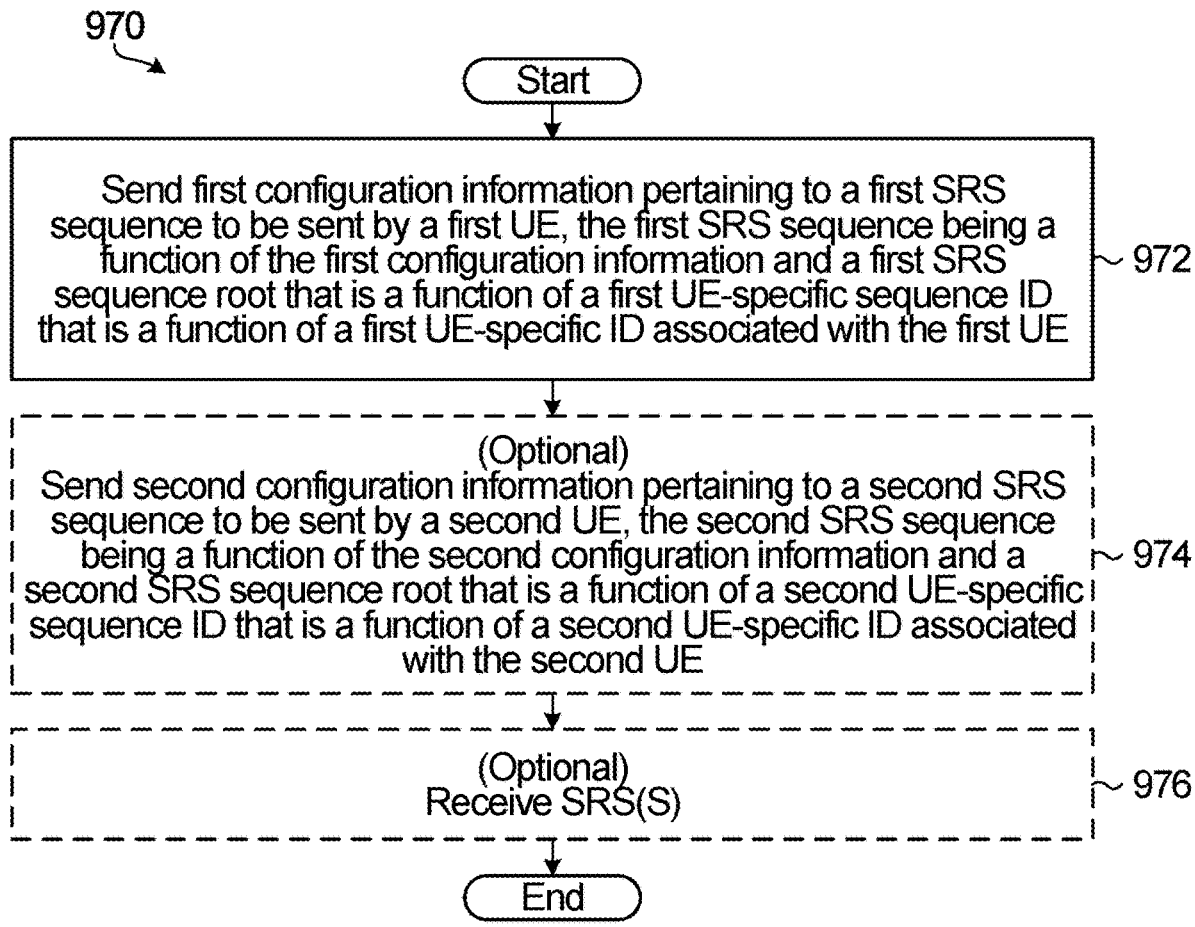
FIG. 14 illustrates a process of provisioning SRSs in a network in accordance with another embodiment of the present disclosure.

FIG. 14 illustrates a flow diagram of example operations 970 in a TRP for assigning sounding reference signals in a wireless communication network according to other example embodiments described herein.

In block 972, the TRP sends first configuration information pertaining to a first SRS sequence to be sent by a first UE, the first SRS sequence being a function of the first configuration information and a first SRS sequence root that is a function of a first UE-specific sequence ID that is a function of a first UE-specific ID associated with the first UE. Optionally, in block 974, the TRP sends second configuration information pertaining to a second SRS sequence to be sent by a second UE, the second SRS sequence being a function of the second configuration information and a second SRS sequence root that is a function of a second UE-specific sequence ID that is a function of a second UE-specific ID associated with the second UE. Optionally, in block 976, the TRP receives an SRS from one or more of the UEs.

The example operations 970 are illustrative of an example embodiment. Various ways to perform the illustrated operations, as well as examples of other operations that may be performed, are described herein. Further variations may be or become apparent.

For example, in some embodiments, the first UE-specific ID associated with the first UE is a C-RNTI associated with the first UE.

In some embodiments, the first configuration information comprises at least one of: SRS sequence scheduled timing information, SRS sequence length information, physical resource mapping information, transmission comb information, cyclic shift information, and frequency hopping information.

In some embodiments, the first configuration information further comprises information to selectively enable or disable dependence of the first SRS sequence root on the SRS sequence scheduled timing information.

In some embodiments, the SRS sequence scheduled timing information has an orthogonal frequency division multiplexing (OFDM) symbol time granularity.

In some embodiments, the first SRS sequence is to be sent by the first UE using a first time and frequency resource, the second SRS sequence is to be sent by the second UE using a second time and frequency resource, and the first time and frequency resource at least partially overlaps with the second time and frequency resource.

In some embodiments, the first and second SRS sequence roots are different; and the first and second SRS sequences are mapped to non-overlapping time and frequency resource elements.

In some embodiments, the operations 970 further include the TRP sending third configuration information pertaining to a third SRS sequence to be sent by the first UE as part of a first SRS that also includes the first SRS sequence, the third SRS sequence being a function of the third configuration information and a third SRS sequence root that is a function of a third UE-specific sequence ID that is a function of the first UE-specific ID associated with the first UE. The TRP may also send fourth configuration information pertaining to a fourth SRS sequence to be sent by the second UE as part of a second SRS that also includes the second SRS sequence, the fourth SRS sequence being a function of the fourth configuration information and a fourth SRS sequence root that is a function of a fourth UE-specific sequence ID that is a function of the second UE-specific ID associated with the second UE.

In some embodiments, the third and fourth SRS sequences are mapped to fully overlapping time and frequency resource elements; and the third and fourth SRS sequences are orthogonal.

In some embodiments, the third and fourth SRS sequence roots are the same; and the fourth SRS sequence is a cyclic shift of the third SRS sequence.

In some embodiments, the operations 970 further include the TRP receiving, from the first UE, the first SRS that includes at least the first SRS sequence and the third SRS sequence.

Figure 15:
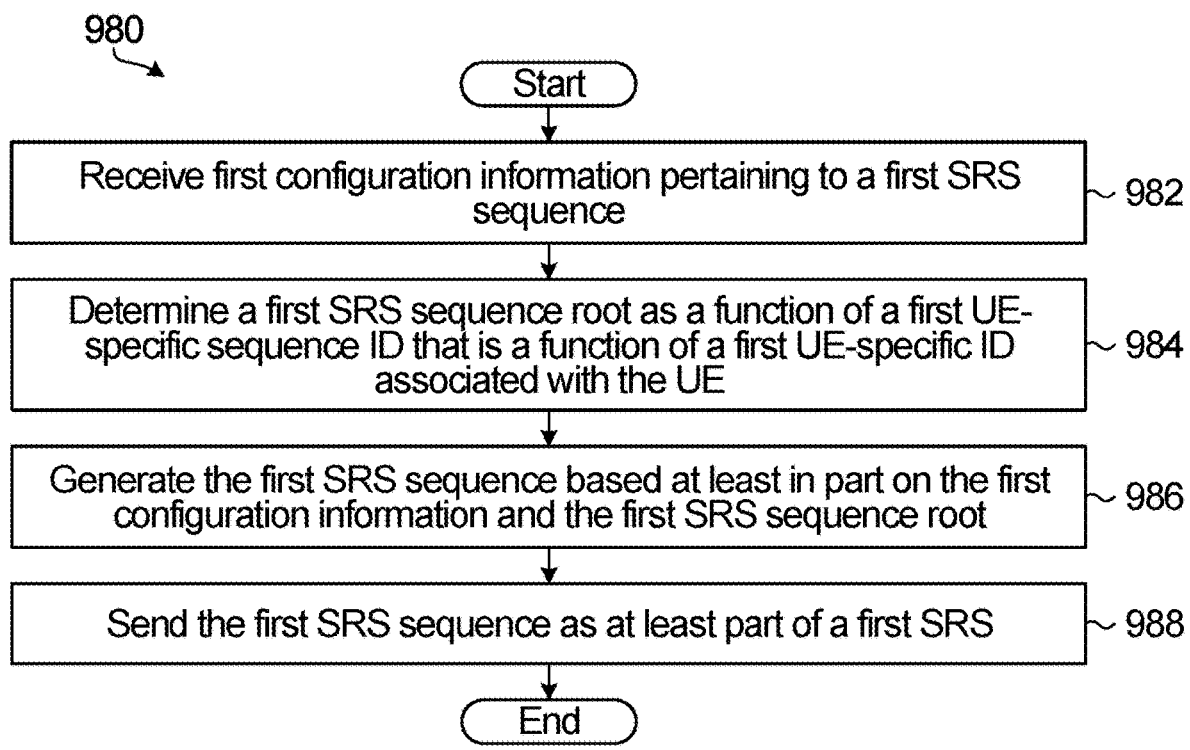
FIG. 15 illustrates a process of generating SRSs at a UE in accordance with another embodiment of the present disclosure.

FIG. 15 illustrates a flow diagram of example operations 980 in a UE for generating sounding reference signals in a wireless communication network according to other example embodiments described herein.

In block 982, the UE receives first configuration information pertaining to a first SRS sequence. In block 984, the UE determines a first SRS sequence root as a function of a first UE-specific sequence ID that is a function of a first UE-specific ID associated with the UE. In block 986, the UE generates the first SRS sequence based at least in part on the first configuration information and the first SRS sequence root. In block 988, the UE sends the first SRS sequence as at least part of a first SRS.

The example operations 980 are illustrative of an example embodiment. Various ways to perform the illustrated operations, as well as examples of other operations that may be performed, are described herein. Further variations may be or become apparent.

For example, in some embodiments, the first UE-specific ID associated with the UE is a C-RNTI associated with the UE.

In some embodiments, the first configuration information comprises at least one of: SRS sequence scheduled timing information, SRS sequence length information, physical resource mapping information, transmission comb information, cyclic shift information, and frequency hopping information.

In some embodiments, the SRS sequence scheduled timing has an orthogonal frequency division multiplexing (OFDM) symbol time granularity.

In some embodiments, the first configuration information further comprises information to selectively enable or disable dependence of the first SRS sequence root on the SRS sequence scheduled timing information, and the method further comprises: enabling or disabling the dependence of the first SRS sequence root on the SRS sequence scheduling time in accordance with the first configuration information.

In some embodiments, determining the first SRS sequence root in block 984 comprises determining a plurality of SRS sequence roots, inclusive of the first SRS sequence root, that are each a function of the first UE-specific sequence ID. In such embodiments, generating the first SRS sequence in block 986 may include generating a plurality of first SRS sequences, inclusive of the first SRS sequence, based at least in part on the plurality of first SRS sequence roots, and sending the first SRS sequence as at least part of the first SRS in block 988 may include sending the plurality of first SRS sequences as at least part of the first SRS.

In some embodiments, each first SRS sequence root of the plurality of first SRS sequence roots is a function of a respective OFDM symbol time.

In some embodiments, the operations 980 further include the UE determining a third SRS sequence root as a function of a third UE-specific sequence ID that is a function of the first UE-specific ID associated with the UE; generating, at the UE, a third SRS sequence based at least in part on the third SRS sequence root; and sending, from the UE, the third SRS sequence as part of the first SRS.

In some embodiments, the first SRS is sent by the UE using a first time and frequency resource that at least partially overlaps with a second time and frequency resource used by a second UE to send a second SRS, wherein the UEs are served by respective subsets of at least one transmit/receive point (TRP) in the same cell.

In some embodiments, sending the first SRS sequence as at least part of the first SRS comprises mapping the first SRS sequence to physical resources based on a network configurable number of allowed SRS bandwidths.

In some embodiments, the operations 980 further include the UE determining the number of allowed SRS bandwidths based on the first UE-specific ID associated with the UE or a UE group-specific ID associated with a UE group to which the UE belongs.

Figure 16:
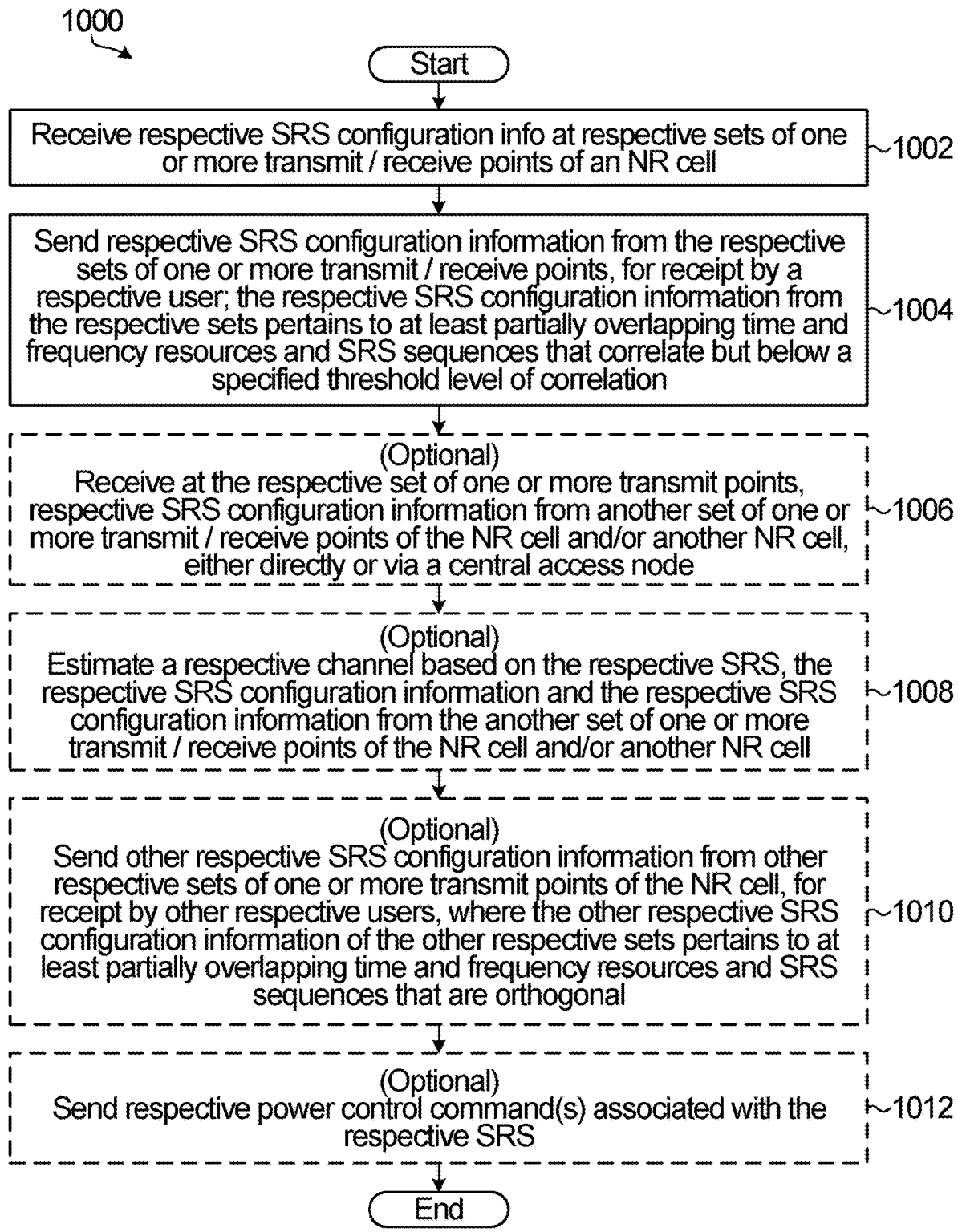
FIG. 16 illustrates a process of provisioning SRSs in a network in accordance with another embodiment of the present disclosure.

FIG. 16 illustrates a process of provisioning and receiving SRSs in a NR network in accordance with an embodiment of the present disclosure. The process/method 1000 is performed by the various components of the NR network previously described herein with reference to FIGS. 1-10. The method 1000 commences with receiving respective SRS configuration info at respective sets of one or more transmit/receive points of a NR cell (Step 1002). This information could be received from a central access point for example, which can include internally receiving in a transmit/receive point from a collocated central access unit, or via another transmit/receive point. Operation 1000 continues with sending the respective SRS configuration information from the respective sets of one or more transmit/receive points, for receipt by respective users, where the respective SRS configuration information of the respective sets pertains to at least partially overlapping time and frequency resources and SRS sequences that correlate, but below a specified threshold level of correlation (Step 1004). Optionally, the method 1000 continues with receiving at the respective sets of one or more transmit/receive points, respective SRS configuration information from another set of one or more transmit/receive points of the NR cell or another NR cell, either directly or via a central access unit (Step 1006) and estimating a respective channel based on the respective SRS, the respective SRS configuration information and the SRS configuration information from the another set of one or more transmit/receive points of the NR cell (Step 1008).

Further, the method 1000 optionally includes sending other respective SRS configuration information from other respective sets of one or more transmit/receive points of the NR cell, for receipt by other respective users, where the other respective SRS configuration information of the other respective sets pertains to at least partially overlapping time and frequency resources and SRS sequences that are orthogonal (Step 1010). Moreover, the method 1000 may optionally include sending a respective power control commands associated with the respective SRS (Step 1012).

While a particular order of steps is illustrated in FIG. 16, a method according to the present disclosure may include a greater or lesser number of steps than those illustrated in FIG. 16. Moreover, the illustrated steps of FIG. 16 may be performed in differing orders than illustrated. Further, operations according to the present disclosure may repeat one or more of the illustrated steps, within or outside of the order illustrated.

Figure 17:
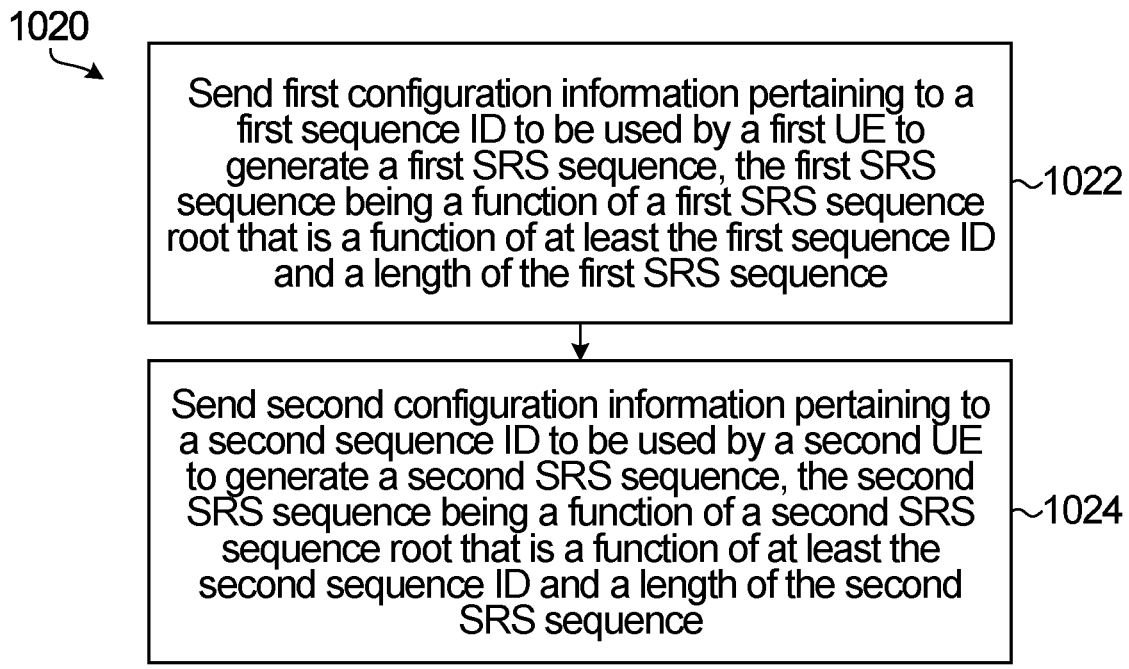
FIG. 17 illustrates a process of provisioning SRSs in a network in accordance with another embodiment of the present disclosure.

FIG. 17 illustrates a flow diagram of example operations 1020 in a TRP for assigning sounding reference signals in a wireless communication network according to example embodiments described herein.

In block 1022, the TRP sends first configuration information pertaining to a first sequence ID to be used by a first UE to generate a first SRS sequence, the first SRS sequence being a function of a first SRS sequence root that is a function of at least the first sequence ID and a length of the first SRS sequence. In block 1004, the TRP sends second configuration information pertaining to a second sequence ID to be used by a second UE to generate a second SRS sequence, the second SRS sequence being a function of a second SRS sequence root that is a function of at least the second sequence ID and a length of the second SRS sequence. The first and second configuration information comprise information to selectively enable or disable the dependence of the first and second SRS sequence roots on an SRS sequence scheduling time.

Variations of the example operations 1020 could include any or all of the following:

the lengths of the first and second SRS sequences are a function of the first and second sequence IDs, respectively;

at least one of the first and second sequence IDs overrides a default sequence ID;

the default sequence ID for each of the first and second UEs is a function of a UE-specific ID associated with the respective UE the lengths of the first and second SRS sequences are equal;

the lengths of the first and second SRS sequences are different;

the first sequence ID and the second sequence ID are the same;

the first sequence ID and the second sequence ID are different;

the first and second sequence IDs are UE-specific sequence IDs assigned to the first and second UEs, respectively;

the first and second sequence IDs are UE group-specific sequence IDs that are respectively assigned to first and second UE groups to which the first and second UE's respectively belong;

a first SRS is to be sent by the first UE using a first time and frequency resource, a second SRS is to be sent by the second UE using a second time and frequency resource, and the first time and frequency resource at least partially overlaps with the second time and frequency resource;

further comprising: sending, from the TRP, third configuration information pertaining to a third sequence ID to be used by the first UE to generate a third SRS sequence, the third SRS sequence being a function of a third SRS sequence root that is a function of at least the third sequence ID and a length of the third SRS sequence; sending, from the TRP, fourth configuration information pertaining to a fourth sequence ID to be used by the second UE to generate a fourth SRS sequence, the fourth SRS sequence being a function of a fourth SRS sequence root that is a function of at least the fourth sequence ID and a length of the fourth SRS sequence;

the third SRS sequence in the first SRS fully overlaps time and frequency resource elements with the fourth SRS sequence in the second SRS; and the third and fourth SRS sequences are orthogonal;

the third and fourth SRS sequence roots are the same; and the fourth SRS sequence is a cyclic shift of the third SRS sequence;

the first and second SRS sequence roots are different; and the first SRS sequence in the first SRS is non-overlapping with the second SRS sequence in the second SRS;

further comprising: sending, by the TRP, first physical resource mapping configuration information pertaining to a first allowed number of SRS bandwidths to be used by the first UE for physical resource mapping of the first SRS; and sending, by the TRP, second physical resource mapping configuration information pertaining to a second allowed number of SRS bandwidths to be used by the second UE for physical resource mapping of the second SRS;

the SRS sequences are Zadoff-Chu sequences.

The example operations 1020 are illustrative of an example embodiment. Various ways to perform the illustrated operations, as well as examples of other operations that may be performed, are described herein. Further variations may be or become apparent.

Figure 18:
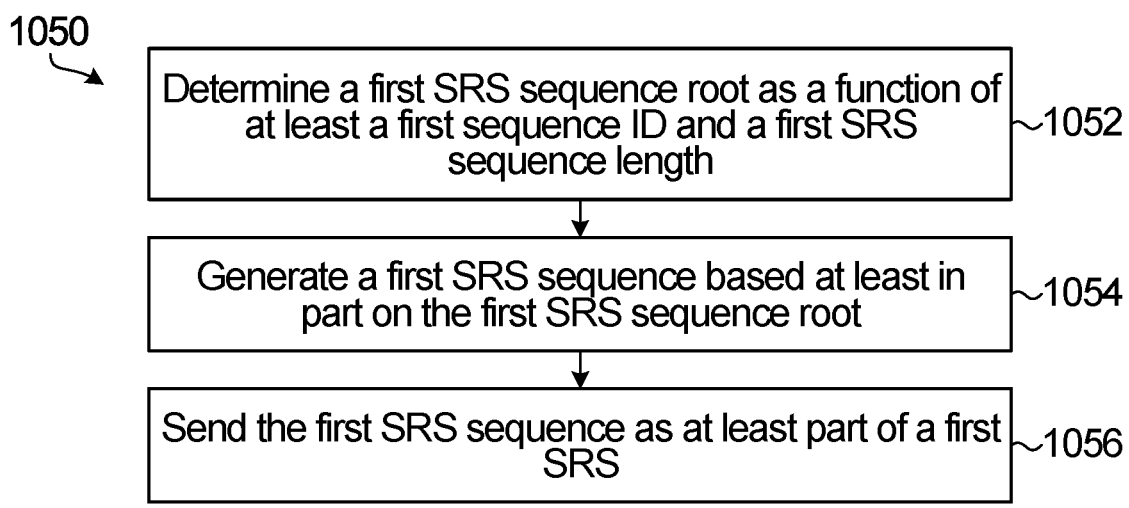
FIG. 18 illustrates a process of generating SRSs at a UE in accordance with another embodiment of the present disclosure.

FIG. 18 illustrates a flow diagram of example operations 1050 in a UE for generating sounding reference signals in a wireless communication network according to example embodiments described herein.

In block 1052, the TRP determines a first SRS sequence root as a function of at least a first sequence ID and a first SRS sequence length. In block 1054, the TRP generates a first SRS sequence based at least in part on the first SRS sequence root. In block 1056, the TRP sends the first SRS sequence as at least part of a first SRS.

Variations of the example operations 1050 could include any or all of the following:

further comprising, determining, at the UE, the first SRS sequence length based at least in part on the first sequence ID;

determining the first SRS sequence root comprises determining the first SRS sequence root as a function of at least the first sequence ID, the first SRS sequence length and an SRS sequence scheduling time;

further comprising enabling or disabling the dependence of the first SRS sequence root on the SRS sequence scheduling time responsive to configuration information received from the communication network;

further comprising receiving the first sequence ID from the communication network via higher layer signaling;

the first sequence ID is a UE-specific sequence ID assigned to the UE;

the first sequence ID is a UE group-specific sequence ID assigned to a UE group to which the UE belongs;

the first SRS is to be sent by the UE using a first time and frequency resource that at least partially overlaps with a second time and frequency resource used by a second UE to send a second SRS, wherein the UEs are served by respective subsets of at least one transmit/receive point in the same cell;

further comprising: determining, at the UE, a third SRS sequence root as a function of at least a third sequence ID and a third SRS sequence length; generating, at the UE, a third SRS sequence based at least in part on the third SRS sequence root; and sending, from the UE, the third SRS sequence as part of the first SRS;

the third SRS sequence in the first SRS fully overlaps time and frequency resource elements with a fourth SRS sequence sent by the second UE as part of the second SRS; and the third and fourth SRS sequences are orthogonal;

the third and fourth SRS sequence roots are the same; and the fourth SRS sequence is a cyclic shift of the third SRS sequence;

the first and second SRS sequence roots are different; and the first SRS sequence in the first SRS is non-overlapping with the second SRS sequence in the second SRS;

sending the first SRS sequence as at least part of the first SRS comprises mapping the first SRS sequence to physical resources based on a network configurable number of allowed SRS bandwidths;

further comprising determining, at the UE, the number of allowed SRS bandwidths based on an identifier that is specific to the UE or specific to a UE group to which the UE belongs;

the SRS sequences are Zadoff-Chu sequences.

The example operations 1050 are illustrative of an example embodiment. Various ways to perform the illustrated operations, as well as examples of other operations that may be performed, are described herein. Further variations may be or become apparent.

Figure 19:
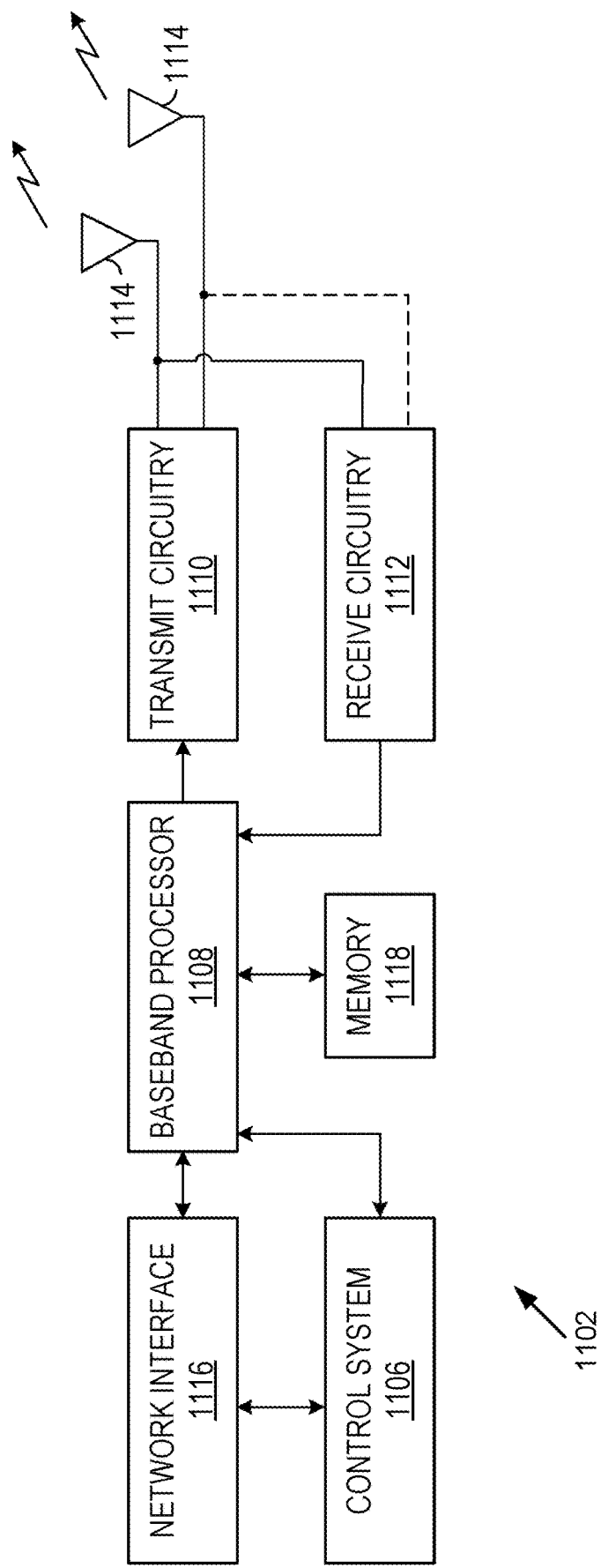
FIG. 19 illustrates a block diagram representation of a NR transmit/receive point in accordance with an embodiment of the present disclosure.

FIG. 19 illustrates a block diagram representation of a NR transmit/receive point in accordance with an embodiment of the present disclosure. A high-level description of a transmit/receive point 1102 that can be used in the NR system described above is illustrated. The transmit/receive point 1102 generally includes a control system 1106, a baseband processor 1108, memory 1118, transmit circuitry 1110, receive circuitry 1112, multiple antennas 1114, and interfaces 1116 which can include network interfaces including an X2 interface, or subsets and variations thereof. The memory 1118 may be any type of memory capable of storing software and data. The receive circuitry 1112 receives radio frequency signals bearing information from one or more remote UE's as will be described in conjunction with FIG. 19. A low noise amplifier and a filter (not shown) may be used to amplify and remove broadband interference from the signal for processing. Down-conversion and digitization circuitry (not shown) will then down convert the filtered, received signal to an intermediate or baseband frequency signal, which is then digitized into one or more digital streams.

The baseband processor 1108 processes the digitized received signal to extract the information or data bits conveyed in the received signal. This processing typically comprises demodulation, decoding, and error correction operations. As such, the baseband processor 1108 is generally implemented in one or more DSPs or application-specific integrated circuits (ASICs). The received information is then sent to an associated network via the network interface 1116 or transmitted to another mobile terminal 1104 serviced by the base station 1102. Amongst other things baseband processor 1108 can perform channel estimation as describe above.

On the transmit side, the baseband processor 1108 receives digitized data, which may represent voice, data, or control information, from the network interface 1116 under the control of the control system 1106, and encodes the data for transmission. The encoded data is output to the transmit circuitry 1110, where it is modulated by a carrier signal having a desired transmit frequency or frequencies. A power amplifier (not shown) will amplify the modulated carrier signal to a level appropriate for transmission, and deliver the modulated carrier signal to the antennas 1114 through a matching network (not shown). Modulation and processing details are described in greater detail below. In one embodiment of the present disclosure, the base station 1102 transmits signals using both antennas 1114, but receives signals using a single antenna 1114.

With respect to the central access units describe earlier, a similar architecture to that for a transmit/receive point in FIG. 19 could be used but with different interfaces and transmit/receive circuitry. For example, the transmit/receive circuitry may be for optical, DSL or any other communication scheme. If collocated with a transmit/receive point, a central access unit could reuse the baseband processor and other components of the transmit/receive point as necessary (e.g. interfaces for communicating with other transmit/receive points).

Figure 20:
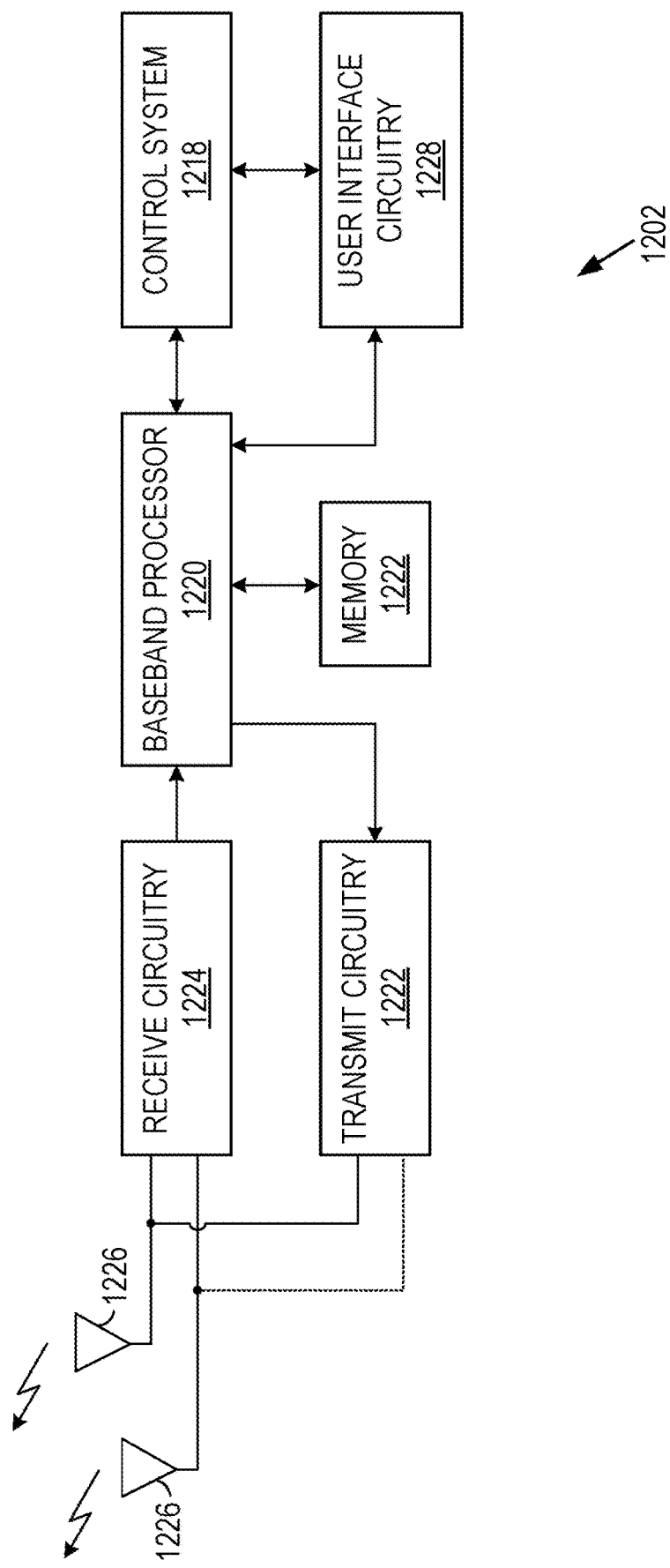
FIG. 20 illustrates a block diagram representation of a NR UE in accordance with an embodiment of the present disclosure.

FIG. 20 illustrates a block diagram representation of a NR UE in accordance with an embodiment of the present disclosure. A high-level description of the components of UE 1202 is shown. Similarly, to the transmit/receive point 1102, the UE 1202 will include a control system 1218, a baseband processor 1220, memory 1222, transmit circuitry 1222, receive circuitry 1224, multiple antennas 1226, and user interface circuitry 1228, or subsets and variations thereof. The receive circuitry 1224 receives radio frequency signals bearing information from one or more base stations 1202. Preferably, a low noise amplifier and a filter (not shown) cooperate to amplify and remove broadband interference from the signal for processing. Down conversion and digitization circuitry (not shown) will then down convert the filtered, received signal to an intermediate or baseband frequency signal, which is then digitized into one or more digital streams.

The baseband processor 1220 processes the digitized received signal to extract the information or data bits conveyed in the received signal. This processing typically comprises demodulation, decoding, and error correction operations, as will be discussed in greater detail below. The baseband processor 1220 is generally implemented in one or more DSP, ASIC, or both.

For transmission, the baseband processor 1220 receives digitized data, which may represent voice, data, or control information, from the control system 1218 or the interface circuitry 1228, which it encodes for transmission. The encoded data is output to the transmit circuitry 1222, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 1226 through a matching network (not shown). The UE 1204 may receive signals using both antennas 1226, but transmits signals using a single antenna 1226. Various modulation and processing techniques available to those skilled in the art are applicable. Amongst other things, baseband processor 1220 can generate SRSs as described above. Specifically, baseband processor 1220 can generate SRSs based on configuration information received from the network.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation may require the performance of an Inverse Discrete Fourier Transform (IDFT) on the information to be transmitted. For demodulation, the performance of a Discrete Fourier Transform (DFT) on the received signal is required to recover the transmitted information. In practice, the IDFT and DFT may be provided by digital signal processing carrying out an Inverse Fast Fourier Transform (IFFT) and Fast Fourier Transform (FFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

Single Carrier FDMA (SC-FDMA) modulation differs from OFDM modulation in that SC-FDMA uses a DFT block before mapping symbols to sub-carriers and that it uses a parallel-to-serial unit after the IFDT block. Otherwise SC-FDMA modulation is otherwise similar to OFDM modulation.

OFDM is used for at least the downlink transmission from the base stations 1102 to the mobile terminals 1204. Each base station 1102 is equipped with n transmit antennas 1114, and each mobile terminal 1204 is equipped with m receive antennas 1226. Notably, the respective antennas can be used for reception and transmission using appropriate duplexers or switches and are so labeled only for clarity.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," "baseband processor," and/or "processing unit" or their equivalents may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributed (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of the disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed technique. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the disclosure. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the one or more embodiments have been expressly described herein, other combinations of these features and functions are likewise possible. The present disclosure of the disclosure is not limited by the particular examples disclosed herein and expressly incorporates these other combinations.

What is claimed is:

1. A method comprising:
   receiving, by a user equipment (UE), a high layer signaling, wherein the high layer signaling comprises orthogonal frequency division multiplexing (OFDM) symbol information and a sounding reference signal (SRS) sequence identifier (ID);
   generating, by the UE, a first SRS sequence in accordance with a first Zadoff-Chu (ZC) root, wherein the first ZC root depends on the SRS sequence ID and a first OFDM symbol, and the first OFDM symbol is determined based on the OFDM symbol information; and
   transmitting, by the UE, the first SRS sequence.

2. The method of claim 1, further comprising:
   generating, by the UE, a second SRS sequence in accordance with a second ZC root, wherein the second ZC root depends on the SRS sequence ID and a second OFDM symbol, the second OFDM symbol is determined based on the OFDM symbol information, the second OFDM symbol is different than the first OFDM symbol; and
   transmitting, by the UE, the second SRS sequence.

3. The method of claim 2, wherein the first ZC root and the second ZC root further depend on a SRS sequence length.

4. The method of claim 2, wherein the first OFDM symbol and the second OFDM symbol are within a time slot.

5. The method of claim 1, wherein the first ZC root depends on a SRS sequence length.

6. The method of claim 1, wherein a SRS sequence hopping is enabled.

7. The method of claim 1, wherein the high layer signaling comprises a radio resource control (RRC) signaling.

8. An apparatus comprising:
   one or more processors in communication with a non-transitory memory storage comprising instructions, wherein the one or more processors are configured to execute the instructions to:
   receive a high layer signaling, wherein the high layer signaling comprises orthogonal frequency division multiplexing (OFDM) symbol information and a sounding reference signal (SRS) sequence identifier (ID);
   generate a first SRS sequence in accordance with a first Zadoff-Chu (ZC) root, wherein the first ZC root depends on the SRS sequence ID and a first OFDM symbol, and the first OFDM symbol is determined based on the OFDM symbol information; and
   transmit the first SRS sequence.

9. The apparatus of claim 8, wherein the one or more processors are further configured to execute the instructions to:
   generate a second SRS sequence in accordance with a second ZC root, wherein the second ZC root depends on the SRS sequence ID and a second OFDM symbol, the second OFDM symbol is determined based on the OFDM symbol information, the second OFDM symbol is different than the first OFDM symbol; and
transmit the second SRS sequence.

10. The apparatus of claim 9, wherein the first ZC root and the second ZC root further depend on a SRS sequence length.

11. The apparatus of claim 9, wherein the first OFDM symbol and the second OFDM symbol are within a time slot.

12. The apparatus of claim 8, wherein the first ZC root depends on a SRS sequence length.

13. The apparatus of claim 8, wherein a SRS sequence hopping is enabled.

14. The apparatus of claim 8, wherein the high layer signaling comprises a radio resource control (RRC) signaling.

15. A non-transitory computer-readable medium having instructions stored thereon that, when executed by an apparatus, cause the apparatus to perform operations, the operations comprising:
 receiving a high layer signaling, wherein the high layer signaling comprises orthogonal frequency division multiplexing (OFDM) symbol information and a sounding reference signal (SRS) sequence identifier (ID);
 generating a first SRS sequence in accordance with a first Zadoff-Chu (ZC) root, wherein the first ZC root depends on the SRS sequence ID and a first OFDM symbol, and the first OFDM symbol is determined based on the OFDM symbol information; and
 transmitting the first SRS sequence.

16. The non-transitory computer-readable medium of claim 15, the operations further comprising:
 generating a second SRS sequence in accordance with a second ZC root, wherein the second ZC root depends on the SRS sequence ID and a second OFDM symbol, the second OFDM symbol is determined based on the OFDM symbol information, the second OFDM symbol is different than the first OFDM symbol; and
 transmitting the second SRS sequence.

17. The non-transitory computer-readable medium of claim 16, wherein the first ZC root and the second ZC root further depend on a SRS sequence length.

18. The non-transitory computer-readable medium of claim 16, wherein the first OFDM symbol and the second OFDM symbol are within a time slot.

19. The non-transitory computer-readable medium of claim 15, wherein a SRS sequence hopping is enabled.

20. The non-transitory computer-readable medium of claim 15, wherein the high layer signaling comprises a radio resource control (RRC) signaling.

* * * * *